United States Patent
Sakamoto et al.

(10) Patent No.: US 7,972,673 B2
(45) Date of Patent: Jul. 5, 2011

(54) OPTICAL RECORDING MEDIUM

(75) Inventors: Tetsuhiro Sakamoto, Kanagawa (JP); Takashi Shimouma, Kanagawa (JP); Shigeki Takagawa, Kanagawa (JP); Jun Nakano, Tokyo (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 11/552,816

(22) Filed: Oct. 25, 2006

(65) Prior Publication Data

US 2007/0097849 A1    May 3, 2007

(30) Foreign Application Priority Data

Oct. 31, 2005 (JP) .............................. P2005-316977
Jan. 31, 2006 (JP) .............................. P2006-023097

(51) Int. Cl.
*B32B 3/02* (2006.01)

(52) U.S. Cl. .................. 428/64.1; 428/64.4; 430/270.12

(58) Field of Classification Search .................. None
See application file for complete search history.

(56) References Cited

U.S. PATENT DOCUMENTS 6,177,166 B1 * 1/2001 Ohno et al. .................. 428/64.1
6,611,486 B2 * 8/2003 Kawase et al. ............. 369/59.25
6,841,219 B2 * 1/2005 Nee .............................. 428/64.1

FOREIGN PATENT DOCUMENTS

| JP | 3454410 | | 7/2003 |
| JP | 2005/050497 | * | 2/2005 |
| WO | WO 2005/056848 | * | 6/2005 |
| WO | WO 2005/056849 | * | 6/2005 |
| WO | WO 2005/056850 | * | 6/2005 |
| WO | WO 2005/056851 | * | 6/2005 |

* cited by examiner

*Primary Examiner* — Elizabeth Mulvaney
(74) *Attorney, Agent, or Firm* — K&L Gates LLP

(57) ABSTRACT

An optical recording medium is provided. The optical recording medium includes at least a reflective film and a cover layer on a substrate; main data by a combination of pit and land are recorded on the substrate; a write-once recording is made to be possible on the reflective film by irradiating a laser light; sub-data are recorded by a mark that is formed by the irradiation of laser light for the write-once recording with respect to the reflective film; a reproducing signal level at portion where said mark is formed increases for the land of specified length; the mark by which the reproduced level decreases at the portion where the mark is formed is formed for an optical disc recording medium manufactured by physical copy; the reflective film is composed of an Ag-alloy film of $Ag_{100-x}X_x$ ($0<x<100$); and the X is selected from Ti, W, Ta, V, Mo, Nb and Zr.

6 Claims, 21 Drawing Sheets

FIG. 17

Table 1

| | | 410nm | 670nm | 790nm |
|---|---|---|---|---|
| Embodiment 5 (Ag-6.8Ti) | Non-Heating | 58.41% | 76.74% | 79.50% |
| | Heating | 59.19% | 78.77% | 81.55% |
| Embodiment 6 (Ag-10Ta) | Non-Heating | 49.58% | 67.13% | 69.12% |
| | Heating | 52.12% | 69.19% | 71.64% |

FIG. 23

| Address | Recording Main Data |
|---------|---------------------|
| 000001  | 00011 · · · 11      |
| 000002  | 11000 · · · 00      |
| 000003  | 00111 · · · 11      |
| ⋮       | ⋮                   |

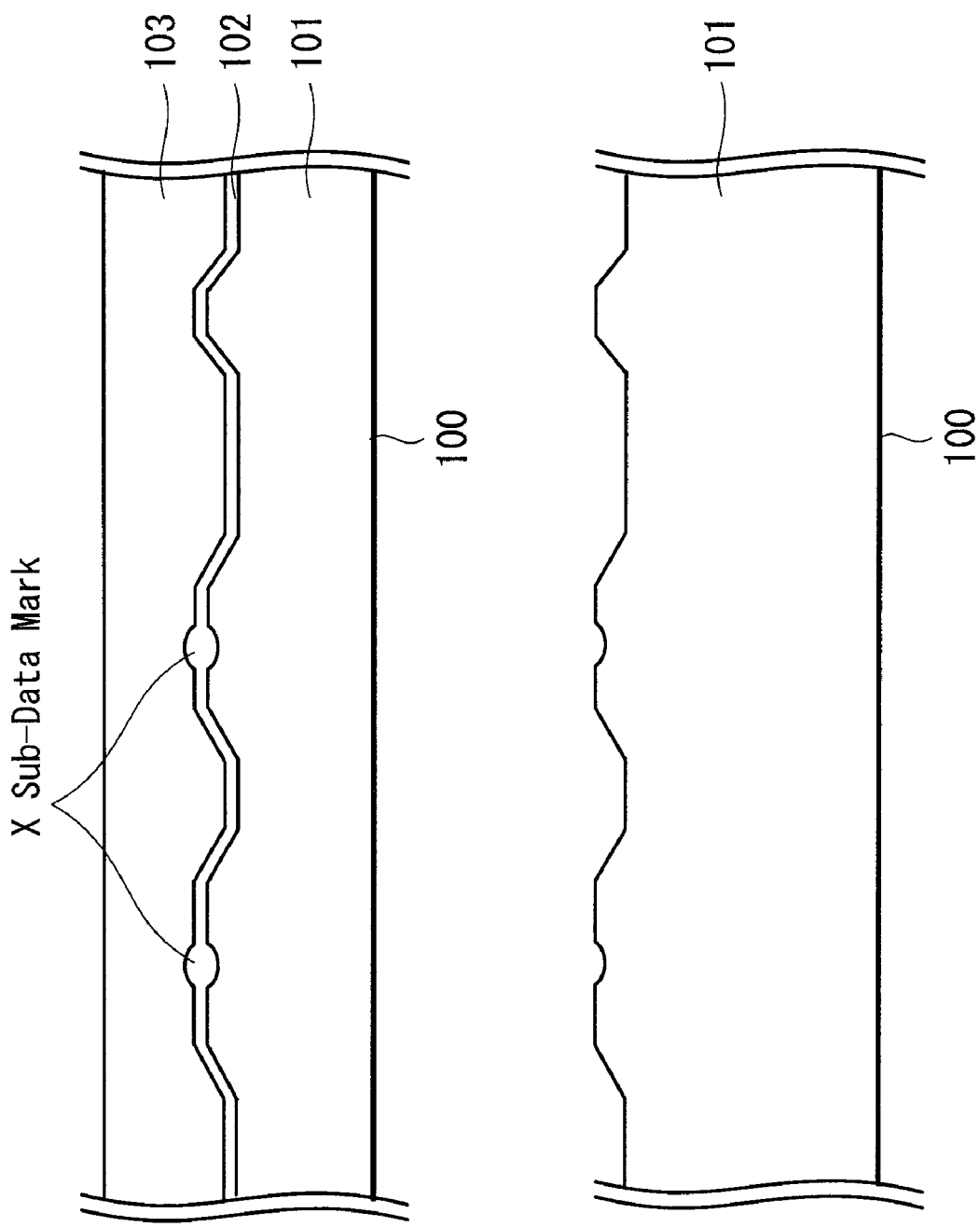

OPTICAL RECORDING MEDIUM

CROSS REFERENCES TO RELATED APPLICATIONS

The present application claims priority to Japanese Patent Application JP 2005-316977 filed in the Japanese Patent Office on Oct. 31, 2005 and Japanese Patent Application JP 2006-023097 filed in the Japanese Patent Office on Jan. 31, 2006, the entire contents of which are being incorporated herein by reference.

BACKGROUND

The present application relates to an optical recording medium, especially to an optical recording medium by which a detection or rejection of an illegal replica-version can be performed effectively.

An optical disc as an optical recording medium, especially a ROM (Read Only Memory) disc of playback-only is widely used in the world as a package-media, because a lot of replica substrate can be produced from one stumper in the short time by an injection forming of plastic.

For example, a CD (Compact Disc), DVD (Digital Versatile Disc) and the like are common in the market as the ROM disc that music, picture and the like are recorded to.

From the past, on the basis of the ROM disc that is sold as a package-media, a disc of replica-version (so-called pirate's version) that copied the recorded data illegally is produced and, that causes a problem of the infringement of the copyright.

As for the disc of pirate's version, generally, a stumper is produced by a mastering process on the basis of a signal reproduced from a normal version disc and thereby producing the disc of replica-version.

Alternatively, it is produced by copying the signal reproduced from the normal version disc, to a recordable disc.

In order to prevent the production of the disc of pirate's version, varieties of methods are proposed and developed. As one of methods, for example, a method by which different identity information is added to each disc is known. A system in which a reproducing apparatus side reads out the identity information of the disc and transmits this to an outside server apparatus via a network can be configured by using the method by which different identity information is added to each disc, like this. By using such system, for example, because the same identity information is detected voluminously by aforesaid server apparatus when the disc of pirate's version are produced and sold, the presence of the discs of pirate's version can be detected. Further, by specifying a reproducing apparatus which transmitted the detected identity information, there is a possibility to be able to specify a seller of pirate's version.

However, even if the identity information that becomes unique is added to each disc, like this, that it is recorded by a method by which the reproduction or copying may not be performed easily by a driving apparatus sold in the market is useful for the protection of the copyright.

Then, a mark of aforesaid identity information is formed on a reflective film of the disc and a very small change of the reflection ratio is given, a method in which the recording is performed by using that is proposed (for example, reference to Patent document 1).

In a disc described in this patent document 1, main data (data of contents, control information or the like) are recorded by a combination of pit and land, and also sub-data (identity information) other than the main data are recorded by forming a mark that gives a very small change of the reflectance to the reflective film on a specified pit and land.

The recording of the mark for the aforesaid reflective film is performed by a laser irradiation whose power is higher than a laser power of the time of reproducing. At this time, the change of the reflectance is made to be very small so that it may not give an influence to the reproducing of main data that are recorded by the combination of pit and land. More specifically, it is done such that the sub-data are not reproduced by the usual reproducing action of the main data.

Then, another reproducing system is provided, and many portions where such very small change of the reflectance is given in the reproducing signal of main data are sampled by sampling, and for example, by obtaining an integrated value of these, the reproduction of this sub-data itself is performed.

In this case, at a recording apparatus side and reproducing apparatus side of the sub-data, the position where the mark as the sub-data is formed is determined by the predetermined specified algorithm. By means of this, the normal reproducing apparatus can specify the position where the mark was recorded by the same algorithm as the one that was used when recording, thereby being able to reproduce the identity information as the sub-data correctly.

And now, it was assumed that the pirate's version disc is produced from the reproducing signal of the ROM disc of normal version, but there is a method, as another method, in which a stumper is made by copying a physical shape of substrate of the ROM disc, as it is.

Specifically, first, shapes of pits and lands that were formed on the substrate are exposed by separating the cover layer and reflective film of the normal version disc from the substrate, and this exposed concavity/convexity is copied physically, thereby copying the contents recorded on the disc and, this is the method.

The disc described in the aforesaid patent document 1 is the one which records the identity information of the individual disc by the mark formed to the reflective film. According to this, by the method of the physical copy which needs to remove the cover layer and reflective film from the aforesaid substrate, the mark (identity information) formed to the reflective film may not be copied, therefore it is conceivable that the production of the pirate's version disc may be protected.

However, practically, the record of the mark to the reflective film is performed by the irradiation of the comparatively high power laser, therefore, at the time of recording the intended mark, it may cause problems such as: the temperature of this recording portion increases, thereby causing local thermal expansion to the disc's substrate; the transformation corresponding to the mark is caused to the substrate itself and the like.

Consequently, the mark to be formed only to the reflective film may be copied to the substrate physically, and by copying this substrate physically, the main data and also sub-data may be copied.

It is explained with respect to this copy with reference to next FIG. 24.

FIG. 24A is a sectional structure of an optical disc 100 in which a mark was formed to a reflective film as doing like the above.

This optical disc 100 is formed with reflective film 102 and cover layer 103 at least on a substrate 101. Then, the concave/convex sectional shape formed between the substrate 101 and the reflective film 102 is the portion where main data is recorded by the combination of pit and land.

Also, as is mentioned above, the mark as sub-data is recorded to the reflection layer on the specified pit or land, as shown with numeral X. In the figure, an example in which the mark (X) is recorded to the reflective film 102 on the specified land is shown.

In addition, as for the naming of land in this description, the shaped portion that is optically near to the source of light by which the light is inputted to the concave/convex surface, in the concave/convex surface on the optical recording medium of the optical disc or the like, namely the shaped portion that is the convexity toward the light incident side is called "Land".

In this case, as is mentioned above, at the time of recording of the mark as the sub-data, because the comparative high power laser is irradiated to the reflective film 102, there is possibility that the transformation by the thermal expansion according to the increase of temperature is caused at the portion (X) where the mark is formed. According to this transformation, the hollow of the concave shape is copied to the surface that touches the reflective film 102 of the substrate 101. Consequently, in this case, when the cover layer 103 and the reflective film 102 are removed and the substrate 101 is exposed, it becomes the one in which the concave shape corresponding to the mark that is formed only to the reflective layer 102 was copied to the surface of the substrate 101, as is shown in FIG. 24B.

The concave shaped portion that was copied like this becomes portions where the reflective rate decreases slightly in comparison with the other land portions. Consequently, in a replica substrate to which the concave shape of such substrate 101 is copied as it is and made, it becomes the one that reproduced the mark as sub-data as it is.

Then, when the reflective film and the cover layer are stacked and formed on such replica substrate in the same process as the usual manufacturing process, the pirate's version disc where the main data and sub-data that were recorded on the normal version disc were completely copied may be manufactured.

Patent document 1: Japanese registered patent No. 3454410.

On the other hand, previously, by a Japanese patent application No. 2005-205439 (patent application according to claim of priority on the basis of a Japanese patent application 2005-30272), applicants proposed a reproduction apparatus, reproducing method, recording method, recording method, manufacturing method of optical disc and an optical disc recording medium. By means of those, the reproduction that differs from the normal version of polarity inversion or the like is performed to the so-called pirate's version's optical recording medium by the unauthorized replica, even if copy protection or physical copy of sub-data for detection occurred, as is mentioned above.

SUMMARY

The present application proposes an optical recording medium that can detect the pirate's version and refuse the reproduction of this pirate's version or cause big degradation, by showing more certainly that properties of which the copied sub-data are different from the normal version, by the further development, on the basis of this proposal.

An optical recording medium according to an embodiment has a feature in which at least, a reflective film and a cover layer are stacked and formed on a substrate; main data by a combination of pit and land are recorded on the substrate; a write-once recording is made to be possible on the reflective film by thermal-recording by irradiating a laser light; and sub-data are recorded by a mark that is formed by the irradiation of laser light for the write-once recording with respect to the reflective film. Further, there is included a feature in which a reproducing signal level at a portion where the mark is formed increases for the land of specified length, and the mark is formed by a size and depth of the mark by which the reproducing level decreases at the portion where the mark is formed for an optical disc recording medium that is manufactured by physically copying a surface-shape of the pit and land of the substrate. Furthermore, there is included a feature in which the reflective film is made by an Ag (argentum)-alloy film of $Ag_{100-x}X_x$ (0<x<100), and the X is an element of at least one or more kinds of Ti (titanium), W (tungsten), Ta (tantalum), V (vanadium), Mo (molybdenum), Nb (niobium) and Zr (zirconium).

It was recognized that the optical recording medium according to this configuration has characteristics, as is mentioned later, that the reproducing signal level at the portion where the mark is formed increases, and the reproducing signal level at the portion where the mark is formed decreases for an optical recording medium that is manufactured by physically copying a substrate of this optical recording medium.

Also, in the optical recording medium according to the present invention at the aforesaid configuration, the reflective film is made by an Ag (argentum)-alloy film of $Ag_{100-x}X_x$, and the X is a Ti, and a composition x of the Ti in the Ag-alloy film is selected to be $5 \leq x \leq 17$ (atomic %).

Also, the present application is characterized by that the reflective film is made by an Ag-alloy film of $Ag_{100-x}X_x$, and the X is a W, and a composition x of the W in the Ag-alloy film is selected to be $3 \leq x \leq 11$ (atomic %).

Also, the present application is characterized by that the reflective film is made by an Ag-alloy film of $Ag_{100-x}X_x$, and the X is a Ta, and a composition x of the Ta in the Ag-alloy film is selected to be $1.1 \leq x \leq 10.5$ (atomic %).

Also, the present application is characterized by that the reflective film is made by an Ag-alloy film of $Ag_{100-x}X_x$, and the X is elements at least more than one of kinds of Ti, W, Ta, V, Mo, Nb and Zr, and a summed composition x in the Ag-alloy film is selected to be $1.1 \leq x \leq 17$ (atomic %).

It was possible to be confirmed that polarities of sub-data that are obtained respectively from the normal version and pirate's version of the optical recording medium can be made to be reverse surely, by specifying the element X and compositional rate of the Ag-alloy of the composition of $Ag_{100-x}X_x$ of the reflective film that is mentioned above.

It should be noted that the characteristics that the reproducing signal level increases for the normal version according to the aforementioned present invention and a characteristic in which the reproducing signal level decreases for the replica-version of illegal copy (so-called pirate's version) is obtained when the mark is recorded to the land side.

In addition, "an optical recording medium manufactured by physically copying a shape of substrate" in this invention indicates an optical recording medium manufactured by making a reflective film to a replica substrate manufactured on the basis of a stumper manufactured by physically copying a shape of substrate, or an optical recording medium manufactured by making again a reflective film to a substrate from which a reflective film was removed.

As was mentioned above, by an optical recording medium according to the present invention, an optical recording medium in which a reproducing signal level increases at a portion where a mark is formed in a normal version and a reproducing signal level decreases at a portion where a mark is formed in a pirate's version can be configured. By means of this, an optical recording medium in which polarities of value of sub-data reproduced by a normal version and pirate's version become reverse can be configured, thereby being able to determine whether or not it is the pirate's version.

Additional features and advantages are described herein, and will be apparent from, the following Detailed Description and the figures.

BRIEF DESCRIPTION OF THE FIGURES

FIG. 17 is a table (table 1) that shows measurement results of reflection ratios of an unheated area where a laser light is not irradiated and a heated area where a laser light is irradiated of an optical recording medium according to an embodiment.

FIG. 23 is a table that shows structure of stored data of a reproducing apparatus.

FIG. 24A is a cross section in a recording state of data for a reflective film of an optical recording medium, and FIG. 24B is a cross section that shows a transformation state of that substrate.

DETAILED DESCRIPTION

Embodiment of the optical recording medium of the present application will be explained by using drawings, but the optical recording medium according to the present invention is not limited by these embodiments.

Figure 1:
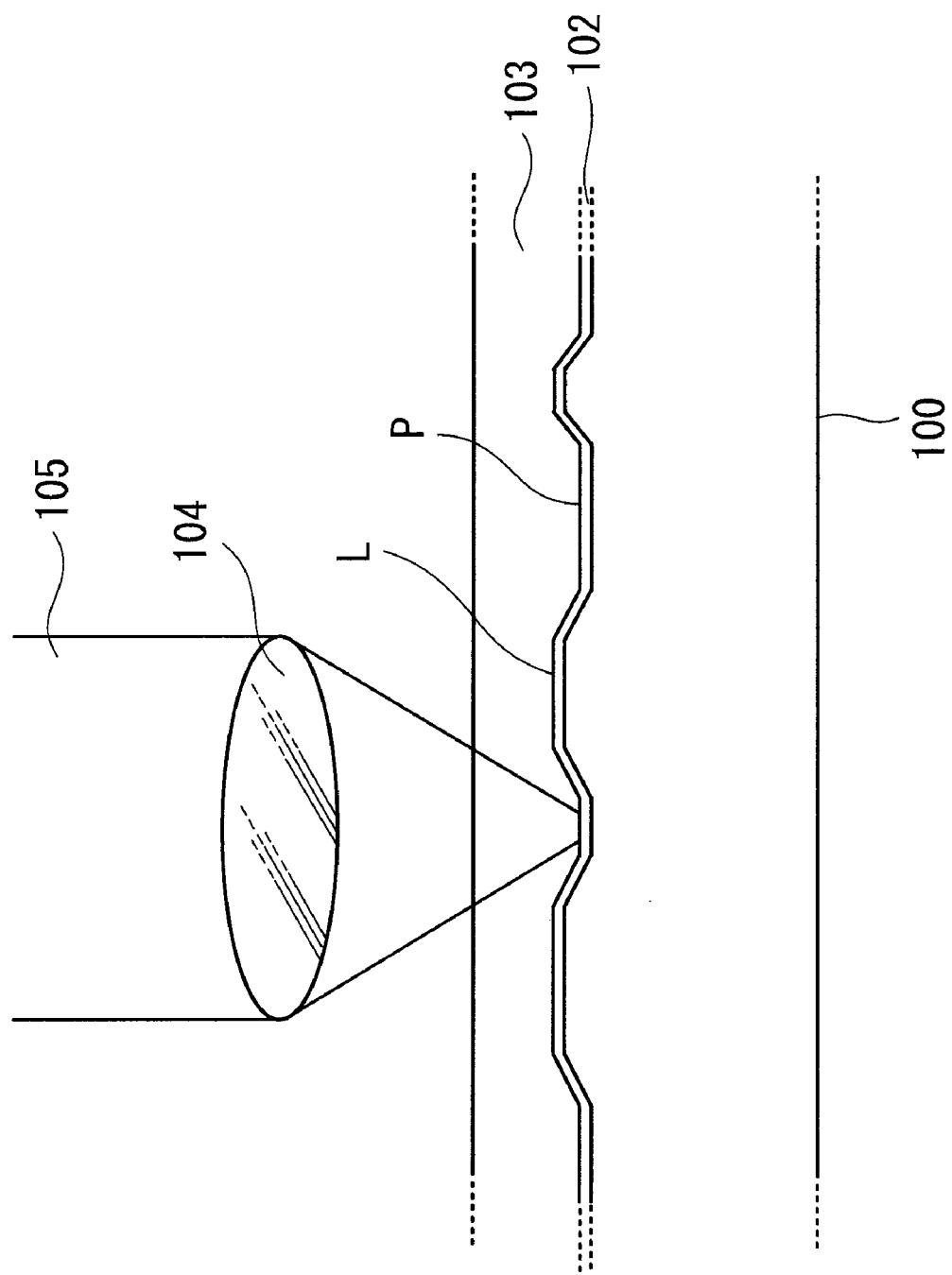
FIG. 1 is an outline of a cross section of an example of an optical recording medium according to an embodiment.

FIG. 1 is an outline of a cross section of an example of an optical disc 100 of ROM type for only reproduction that is illustrated as an embodiment.

Specifically, this optical disc 100 is adapted with a disc structure and format that are based, for example, on a disc that is called "Blu-ray® disc".

This optical disc 100 is configured with stacking and forming a reflective film 102 and cover layer 103 on a substrate 101, as is shown in FIG. 1.

The substrate 101 is a plastic substrate that is made, for example, by polycarbonate or the like and a surface that touches the reflective layer 102 in this substrate 101 is given with a sectional shape of concavity/convexity. The concave sectional portion is a pit P and the convex sectional portion is a land L. Specifically, when a laser light 105 is irradiated from the cover layer 103, a convex sectional portion toward an incident side of this laser light 105 is the land L. Information of main data is recorded by a combination of this pit P and land L, concretely each length of pit P and land L.

The reflective film 102 is stacked and formed on the concave/convex surface of the substrate 101 on which this pit P and land L are formed. Then, further the cover layer 103 made by polycarbonate or the like is stacked and formed on this reflective film 102.

The reflective film 102 is given with the concave/convex sectional shape corresponding to the shapes of pit P and land L by stacking and forming on the substrate 101.

Also, the reflective film 102 obtains a reflected light corresponding to the aforesaid concavity/convexity when the laser light 105 that is focused by an object-lens 104 is irradiated through the cover layer 103, as is shown in the drawing.

Figure 2:
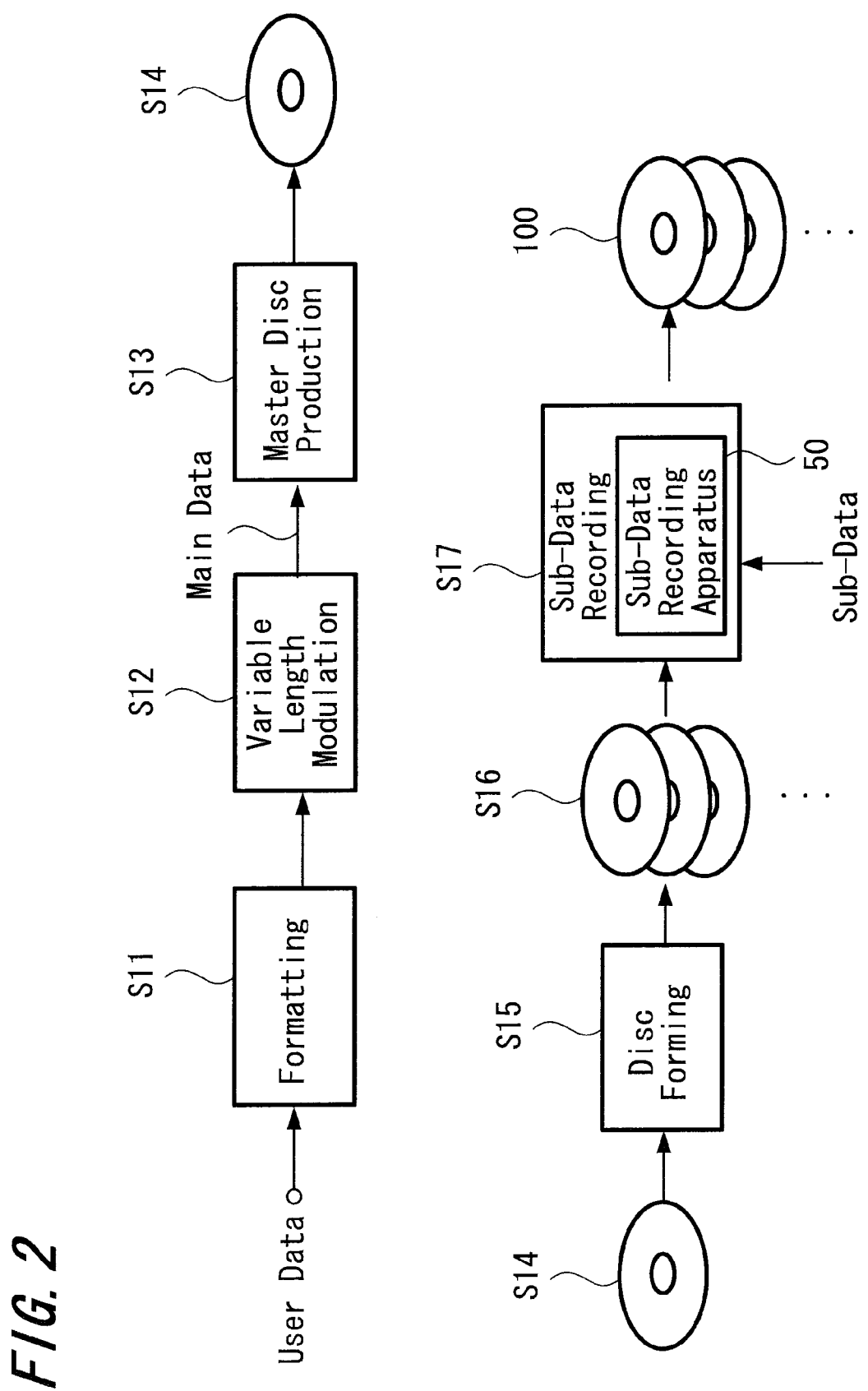
FIG. 2 is an explanatory diagram of a manufacturing process of an optical recording medium according to an embodiment.

In this embodiment of the optical recording medium according to the present invention, first, a manufacturing process of this optical disc is explained, in order to clarify a configuration of an optical disc 100. FIG. 2 is an explanatory diagram of the manufacturing process of the optical disc 100.

In this case, at first, a formatting process S11 of user data is executed. This formatting process S11 is executed, for example, by using a computer or the like.

In this formatting process S11, as for the contents data (user data) that are recorded to the optical disc 100, a conversion's operation is executed so that a format data sequence corresponding to a specified criteria can be obtained. More specifically, in the case of this embodiment, the conversion's operation is implemented so that the data sequence corresponding to criteria of blu-ray disc as is explained later in FIG. 3 can be obtained. Also, actually an error detection cord and an error correction code are added to the user data, and a processing of interleaving and the like are also implemented.

Next, a variable length modulation process S21 is executed. In this process S21, a processing of variable length modulation is implemented to the data sequence produced by the formatting process S11. In the case of the embodiment, a processing of RLL (1, 7) PP modulation and a processing of NRZI modulation are implemented (PLL: Run Length Limited, PP: Parity Preserve/Prohibit, NRZI: Non Return to Zero Inverse).

Patterns of "0" and "1" of the data sequence obtained from this variable length modulation process S12 are actually becoming patterns of the pit and land that are formed on the disc 100.

Like this, the data obtained such that the user data are formatted and the processing of variable length modulation is implemented, is called "main data", here.

Subsequently, a master disc production process S13 is performed. The master disc production process S13 is performed by using a widely known mastering apparatus.

In the master disc production process S13, first, photoresist is applied to coat a glass master disc. Then, the laser light which is modulated depending on the main data generated from aforesaid variable length modulation process S12 is irradiated to it in the condition where the glass master disc that is coated with the photoresist, like this, is drove to rotate, then a processing of developing is performed, thereby forming the patterns of concavity/convexity along recording tracks. Consequently, the pits and lands are formed.

Next, electrolytic plating is performed on the glass master disc on which the pits and lands are formed, and a metal master disc D4 is made by separating this from the glass master disc.

A disc forming process S15 is performed by using the metal master disc D14 that is obtained like this.

In the disc forming process S15, first, a stumper is produced on the basis of aforesaid metal master disc D14. Then, this stumper is arranged in a metallic mold for molding, and the substrate 101 is formed with transparent resin such as polycarbonate, acrylic and the like by an injection molding machine. On this substrate 101, the patterns of the pits and lands corresponding to the main data generated from aforesaid modulation process S12 are formed along the recording tracks.

Then, the reflective film 102 is stacked and formed on this substrate 101 by a deposition-spattering method or the like and further the cover layer 103 is stacked and formed on this reflective film 102. By means of this, first, an optical disc (a main data recorded disc) D16 where main data are recorded is formed.

Subsequently, a sub-data recording process S17 is performed. Specifically, sub-data other than the main data that are recorded by the aforesaid patterns of pits and lands are recorded.

In this case, as the sub-data, as the real data making that becomes the data content portion, for example information of serial number that becomes unique is recorded into each disc D16 where the main data are recorded. Specifically, by means of this, each unique identification information (identification number) is added to each optical disc that is made at the sub-data recording process S17.

Also, as this sub-data, in addition to the identification information as the real data, for example an error correction code is added. By means of adding this error correction code, an error correction processing for aforesaid identification information can be performed when reproducing it.

The sub-data is recorded by forming a mark to the reflective film 102 at a specified location in a specified section of the aforesaid main data made by the pits and lands as is mentioned later, by irradiating a laser light having a recording power.

In this case, the sub-data include identification information and an error correction code, but the other data may also be added.

Figure 3:
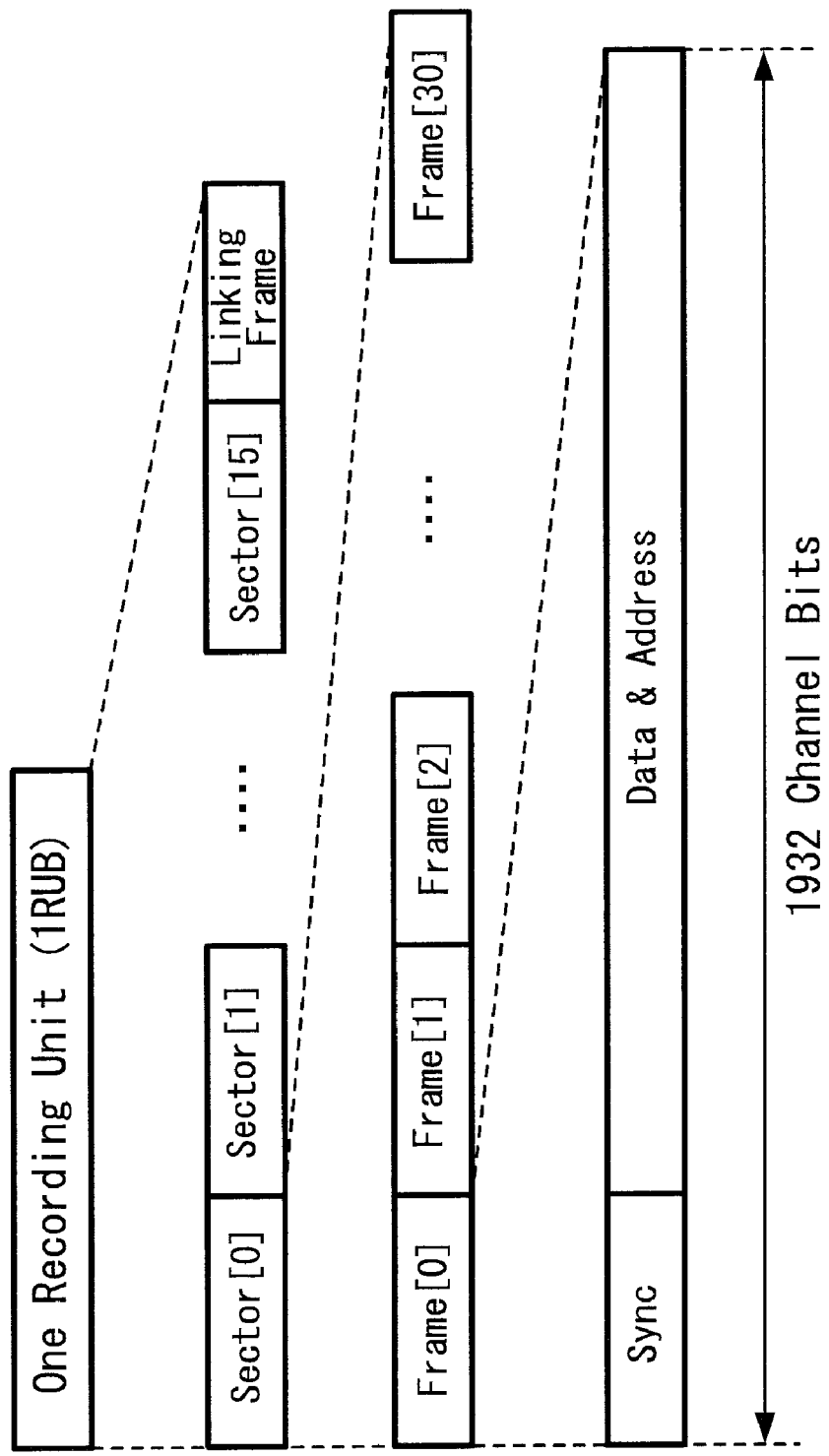
FIG. 3 is an explanatory diagram of main data that are recorded into an optical recording medium according to an embodiment.

FIG. 3 is a diagram that shows a structure of the main data that are recorded into an optical disc 100 manufactured from the aforesaid manufacturing processes.

First, one recording unit called "RUB" is defined, as is illustrated in the diagram. One RUB is configured with sixteen sectors and two linking frames. The linking frame is provided as a buffer area between each RUB.

One sector configures one address unit, in this case.

Then, each sector is configured with 31 frames, as is illustrated in the diagram. Further, one frame is configured with data of 1932 channel bits.

In a blu-ray disc illustrated in this embodiment, the main data complies with the PLL (1, 7) PP modulation rule, thereby restricting sequential numbers of "0" or "1" of code (namely, pit length or land length) to length of 8T from 2T (channel bit), respectively.

At a sync placed at the head of each frame, the sequential code of 9T that does not comply with this modulation rule is inserted and it is used to detect a frame synchronous signal at the time of reproducing.

Next, the embodiment of the optical recording medium according to the present invention which have the aforesaid main data record and in which the sub-data are recorded is explained. However, it is apparent that the optical recording medium is not limited to this embodiment.

As was mentioned above, a substrate 101 in which the concave/convex patterns of pit and land according to the main data are formed is provided.

A reflective film 102 made by Ag-alloy film that is represented with $Ag_{100-x}W_x$ (atomic %) is formed on this substrate 101 by making alloy film to the thickness of this case, more specifically 40 nanometers of thickness of the reflective film 102, by means of the simultaneous sputtering method with Ag (argentum) and W (tungsten).

Then, samples of x=3.5, x=7 and x=10 are provided to identify the differences of characteristics for W (tungsten) composition, in this composition.

In this embodiment, Ag-alloy film that is represented with $Ag_{100-x}Ta_x$ (atomic %) is formed on the same substrate 101 as the embodiment 1 by making reflective film 102 of 40 nanometers of thickness by means of the simultaneous sputtering method with Ag (argentum) and Ta (tantalum).

Then, samples of x=1.8, x=7 and x=10 are provided to identify the differences of characteristics for Ta (tantalum) composition.

A reflective film made by Ag-alloy film that is represented with $Ag_{100-x}\,Ti_x$ (atomic %) is formed on the same substrate 101 as the embodiment 1 by means of the simultaneous sputtering method with Ag (argentum) and Ti (titanium). The thickness is 40 nanometers. Also, samples of x=7, x=10 and X=13 are provided to identify the differences of characteristics for Ti (titanium) composition.

A reflective film made by Ag-alloy film that is represented with $Ag_{90}\,Ti_5\,V_5$ (atomic %) is formed on the same substrate 101 as the embodiment 1 by means of the simultaneous sputtering method with Ag (argentum), Ti (titanium) and V (vanadium). The thickness is 40 nanometers.

Figure 4:
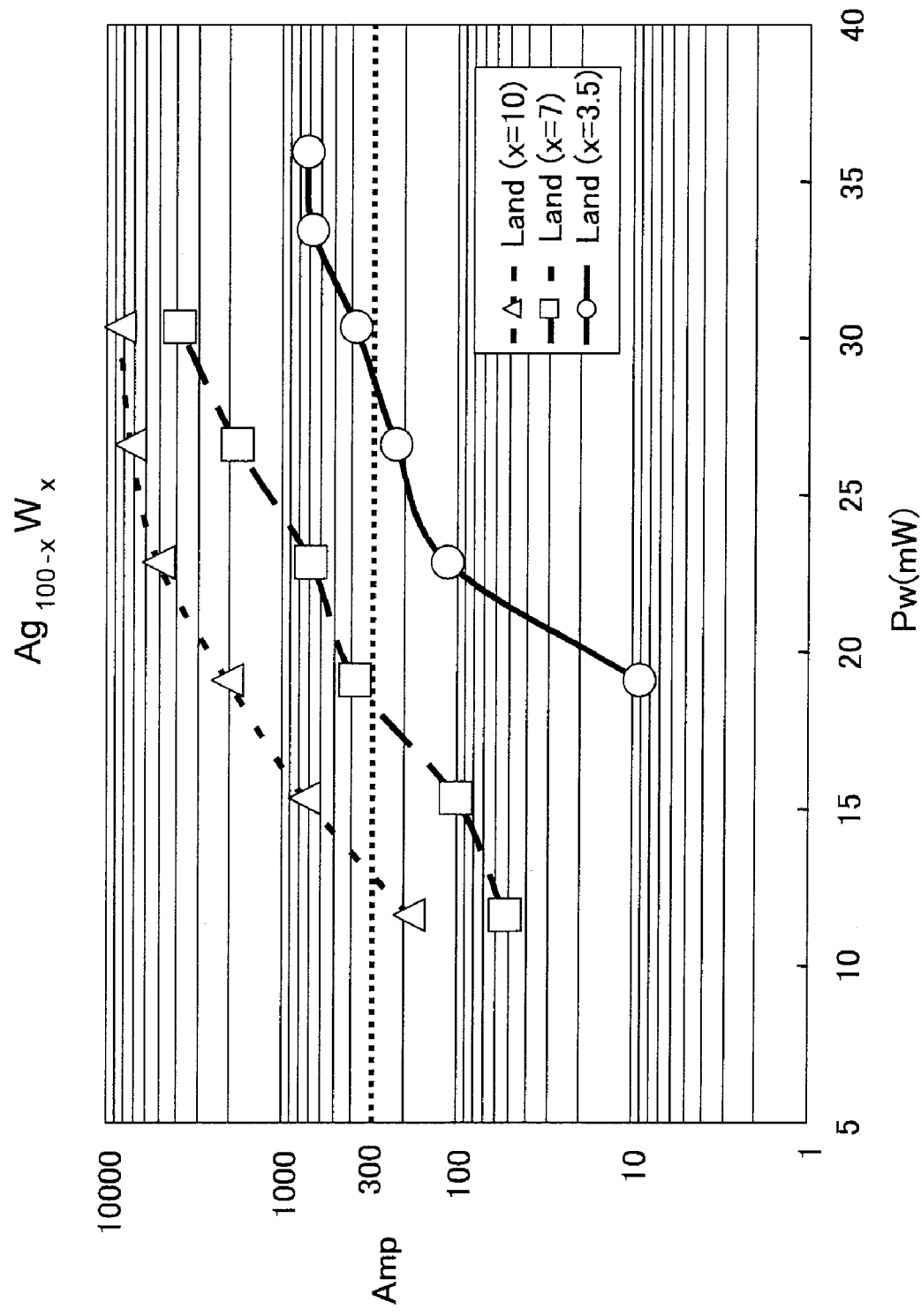
FIG. 4 is a graph that shows a reproducing signal level of sub-data versus a recording laser power when recording sub-data of an optical recording medium in which a reflective film is Ag W-alloy film, according to an embodiment.

FIG. 4 is a graph that plots reproducing signal levels at mark formed portion with "circle", "square" and "triangle", respectively when it is made as x=3.5, x=7 and X=10, in an optical disc of normal version where the reflective film 102 of the embodiment 1 is formed with $Ag_{100-x}W_x$ (atomic %).

In FIG. 4, amplitude at vertical axis shows a value that integrated a value that reduces a non-recording portion of the mark from a recording portion of the mark. Namely, it shows that the larger this value is, the higher the value of reproducing signal RF at mark recording portion is. In addition, in this invention, the value that can finely detect the sub-data signal is determined as Amp □ 300. Also, a Pw (mW) at horizontal axis shows a laser power at the time of recording.

Here, conditions at the time of recording that are set up when the experimental results shown in this FIG. 4 are obtained will be the followings.

First, the mark recording is targeted and performed to land of 6T as the land with a fixed length of the optical disc 100. Also, the reflective film 102 of the optical disc 100 is made as 40 nanometers of film thickness and Ag W alloy film as mentioned above.

Further, when this optical disc 100 is manufactured, each condition that is set up at a sub-data recording apparatus 50 is as follows:

Aperture number NA=0.85; Laser wave length λ=405 nanometers; Recording line speed=4.9 m/second; and a mark recording pulse=30 nanoseconds.

Furthermore, as a structure of the optical disc 100 (main data record disc D 16), it is the one that is based on the blu-ray disc shown in the embodiment, and a truck pitch Tp is 320 nanometers and the length of 1T is 78 nanometers and a pit width is Tp/3 and a pit depth is λ/5.

In the normal version disc corresponding to W (tungsten) content of 3.5 (atomic %), a value (Amp) of the amplitude at vertical axis increases with a larger value than a zero level in the range of the laser power that is more than about 17 mW (milli-watt), and it is understood that Amp becomes Amp≧300 at over 28 mW. Consequently, it is understood that the recording power with more than 28 mW is required at least to obtain a fine sub-data signal at W (tungsten) content of 3.5 (atomic %).

Figure 5:
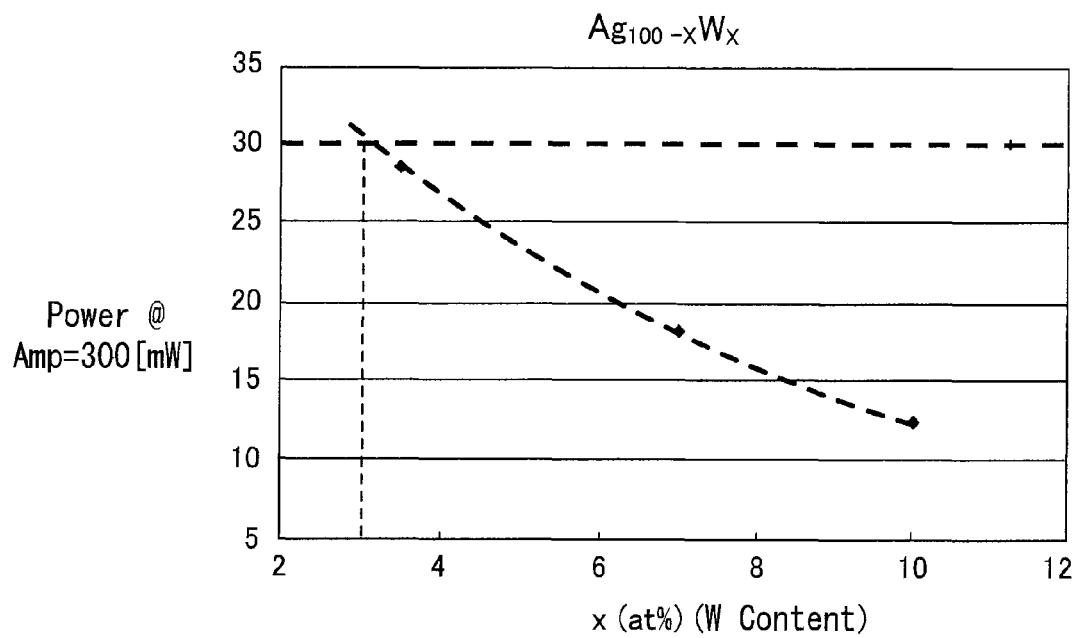
FIG. 5 is a graph that shows a minimum laser power by which a reproducing signal level of sub-data can be detected finely for additional quantity of W of an optical recording medium in which a reflective film is Ag W-alloy film, according to an embodiment.

Similarly, a minimum required recording power is 18 mW at W (tungsten) content of 7.0 (atomic %) and the minimum required recording power is 12.5 mW at W (tungsten) content of 10 (atomic %). FIG. 5 shows a graph in which W contents of Ag W alloy film versus minimum required recording power values that are needed to detect the sub-data signal finely are plotted.

According to FIG. 5, it is understood that the necessary recording power value increases when W content decreases. Because this recording power may not be increased without limitation, it is desirable to be as small as possible from view points of productivity/economic efficiency in the manufacturing of the normal version disc. In this embodiment, it is estimated that an upper limit value is 30 mW. According to FIG. 5, it is understood that w content by which the fine signal can be detected even if the sub-data are recorded with the laser power with less than 30 mW, is equal to or more than 3 (atomic %).

Figure 6:
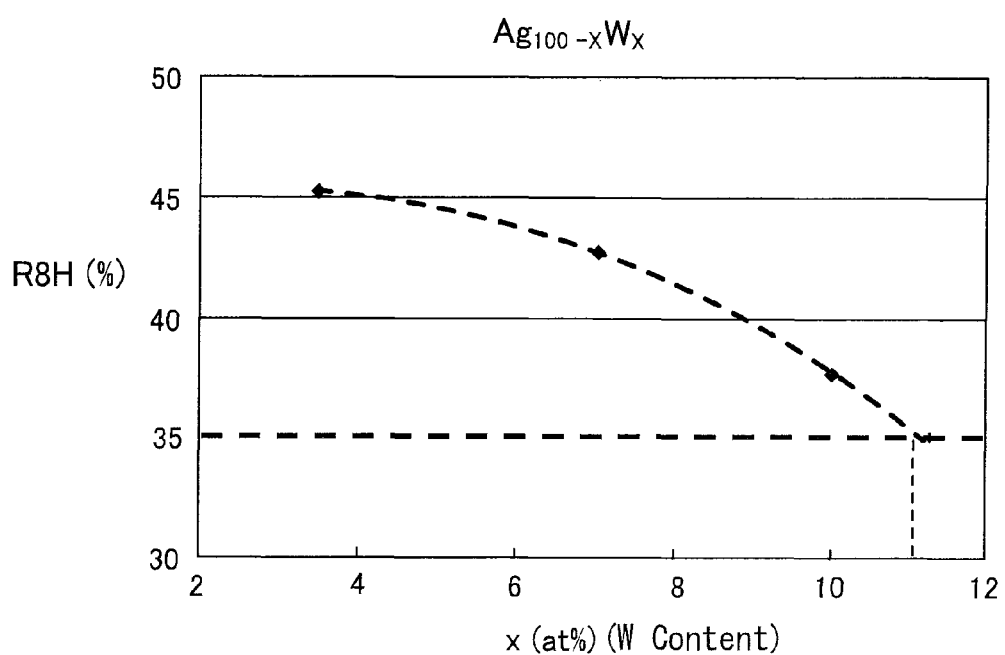
FIG. 6 is a graph that shows a reflection ration (R8H) of a reproducing signal level of main data versus additional quantity of W of an optical recording medium in which a reflective film is Ag W-alloy film, according to an embodiment.
Figure 7:
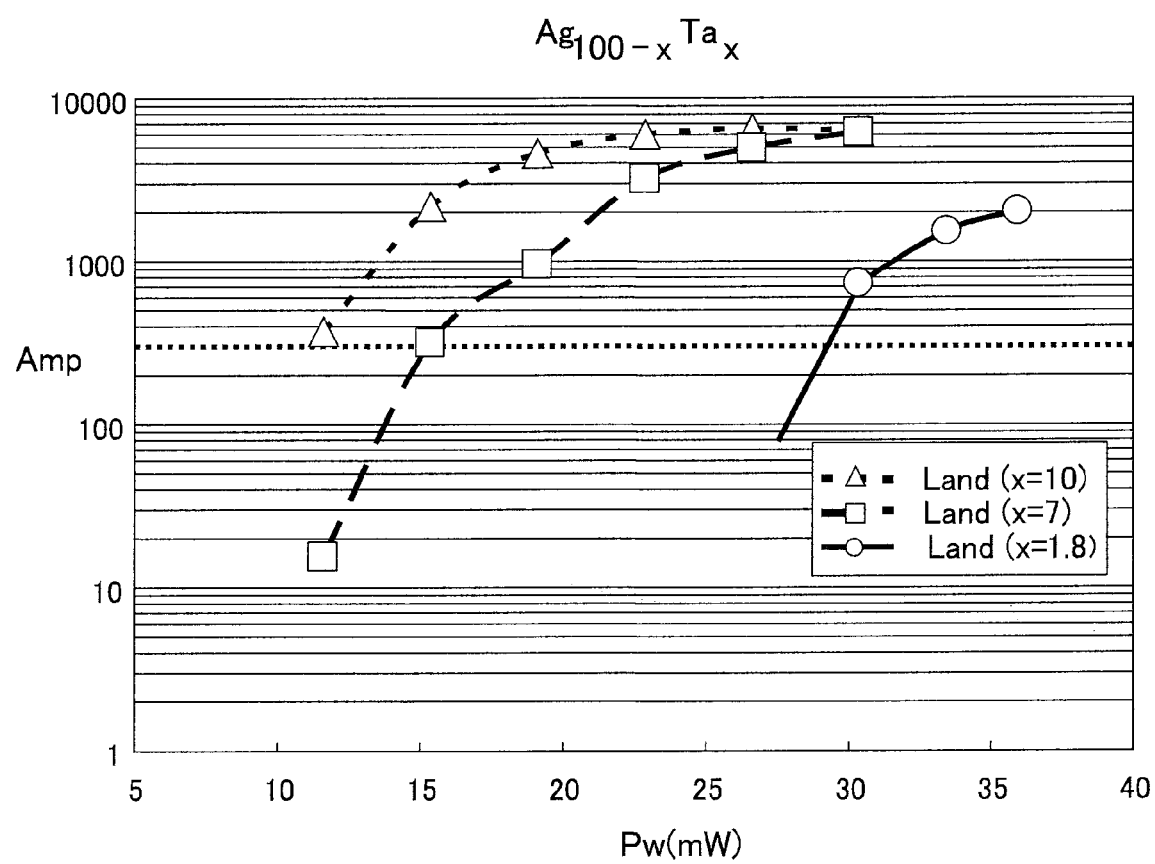
FIG. 7 is a graph that shows a reproducing signal level of sub-data versus a recording laser power when recording sub-data of an optical recording medium in which a reflective film is Ag Ta-alloy film, according to an embodiment.
Figure 8:
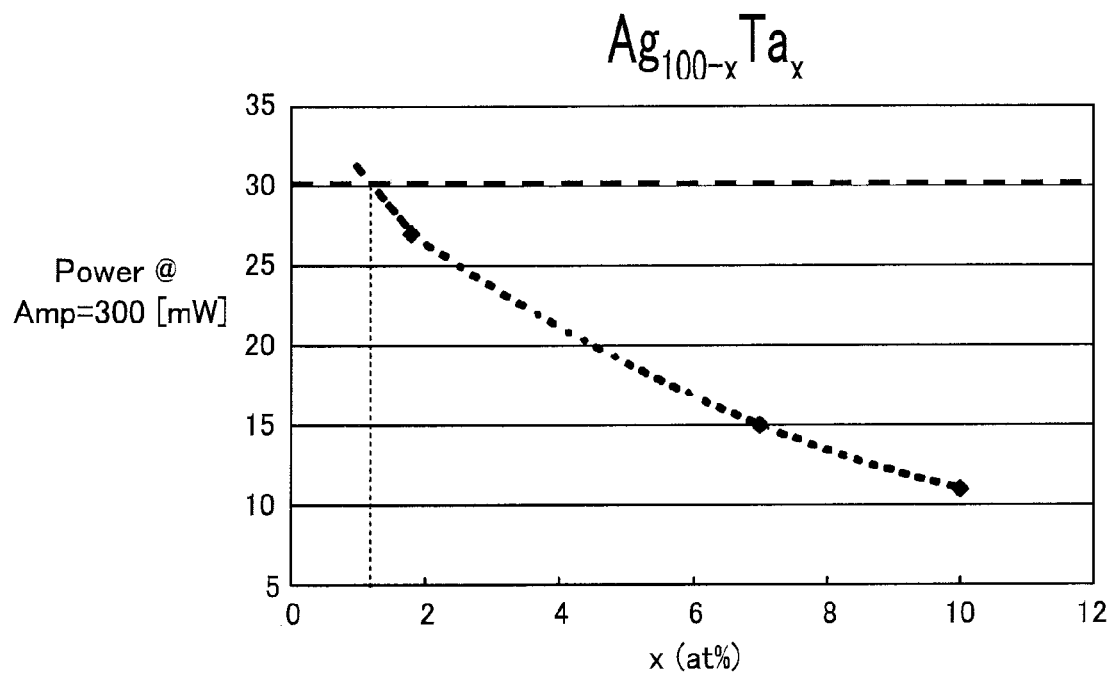
FIG. 8 is a graph that shows a minimum laser power by which a reproducing signal level of sub-data can be detected finely for additional quantity of W of an optical recording medium in which a reflective film is Ag Ta-alloy film, according to an embodiment.
Figure 9:
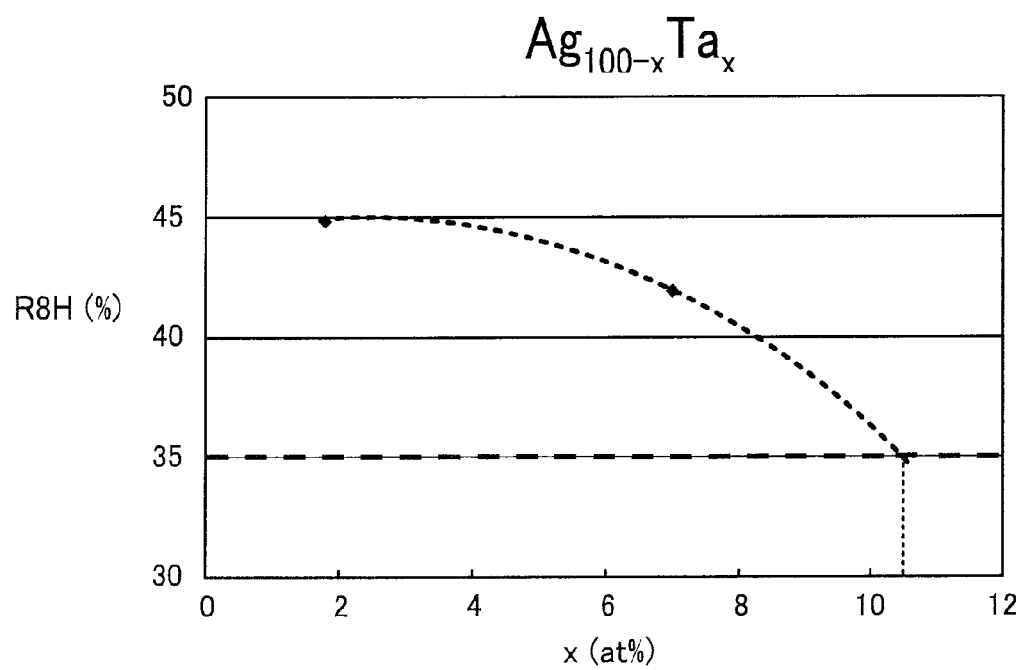
FIG. 9 is a graph that shows a reflection ration (R8H) of a reproducing signal level of main data versus additional quantity of W of an optical recording medium in which a reflective film is Ag Ta-alloy film, according to an embodiment.
Figure 10:
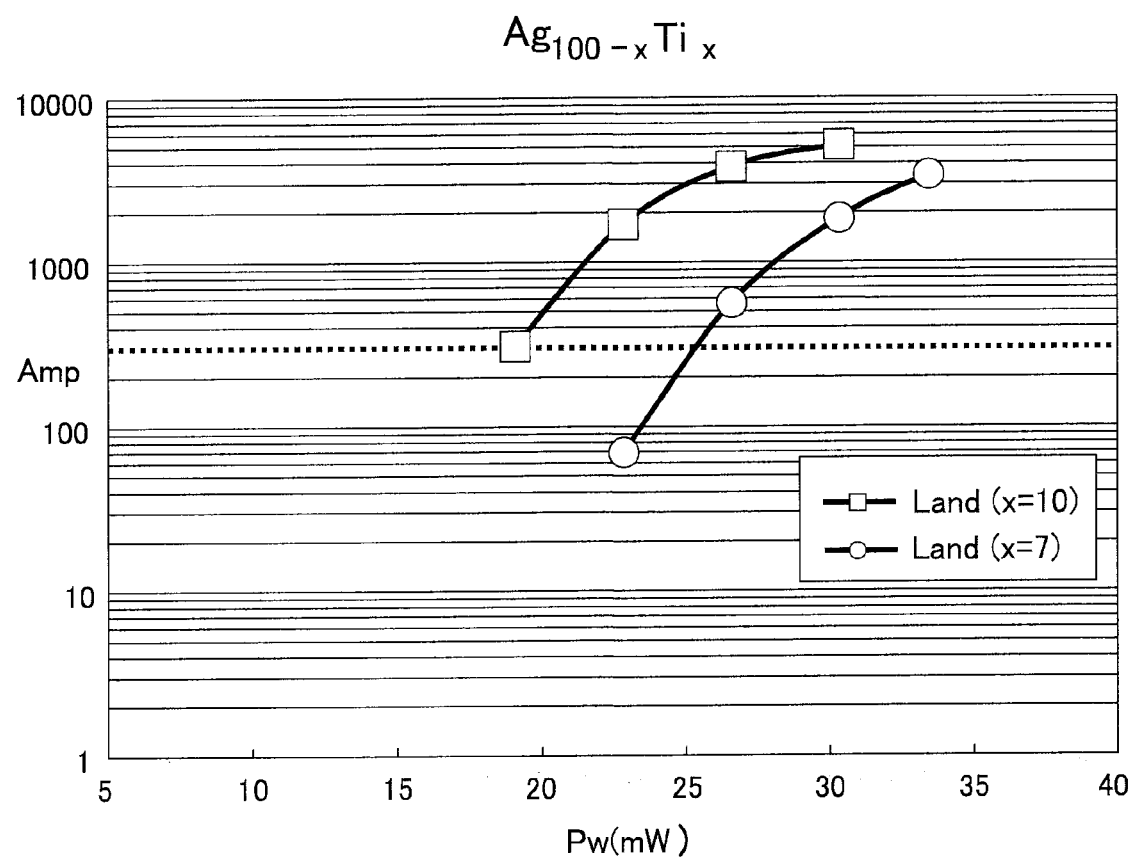
FIG. 10 is a graph that shows a reproducing signal level of sub-data versus a recording laser power when recording sub-data of an optical recording medium in which a reflective film is Ag Ti-alloy film, according to an embodiment.
Figure 11:
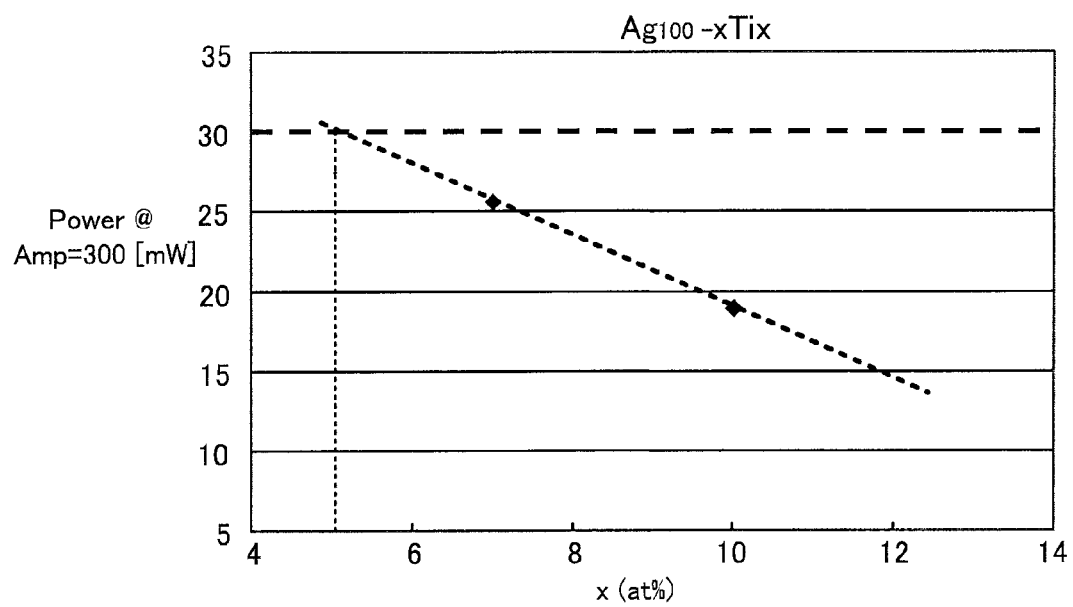
FIG. 11 is a graph that shows a minimum laser power by which a reproducing signal level of sub-data can be detected finely for additional quantity of W of an optical recording medium in which a reflective film is Ag Ti-alloy film, according to an embodiment.
Figure 12:
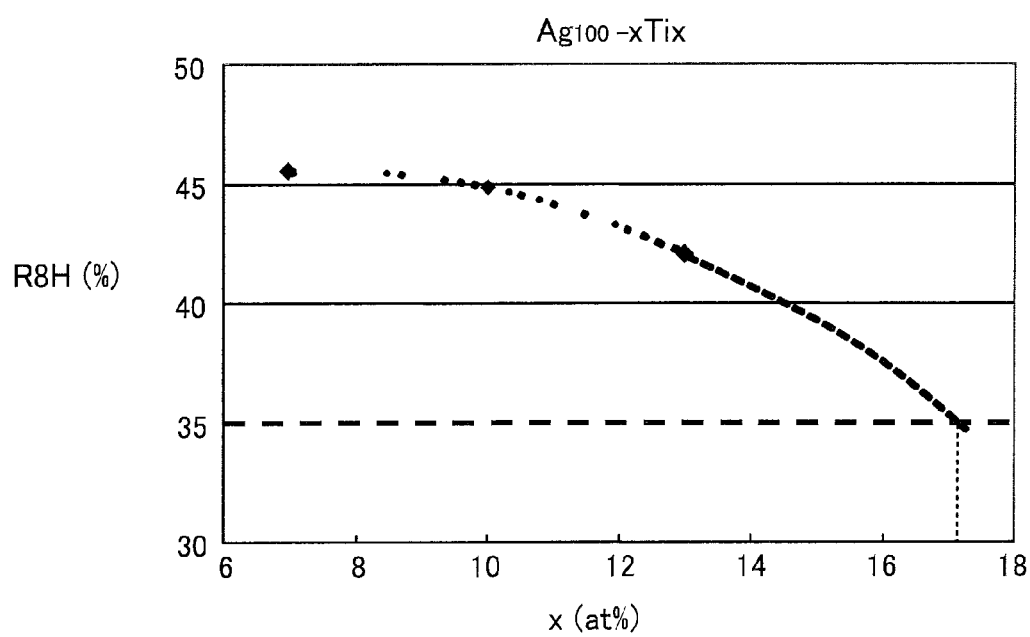
FIG. 12 is a graph that shows a reflection ration (R8H) of a reproducing signal level of main data versus additional quantity of W of an optical recording medium in which a reflective film is Ag Ti-alloy film, according to an embodiment.

Next, characteristics of the reflectance at the reproducing signals of the main data of three kinds of optical discs where w contents are 3, 5, 7 and 10 (atomic %) respectively, are shown in FIG. 6.

Here, R8H means that it is defined in a criteria of the blu-ray disc and it is a maximum reflectance corresponding to a longest mark (8T mark) of the main data, and it is conceivable that the value is needed equal to or more than 35% at a reproduction-only-type blu-ray disc where the information layer is single layer (single layered disc).

According to FIG. 6, it is understood that W content increases, the R8H decreases, and also understood that W content that satisfies R8H≦35% is equal to or less than 11 (atomic %).

According to the above examination, it is understood that a disc where W content is 3 to 11 (atomic %) in the Ag W alloy is able to provide fine main data signal and sub-data signal.

As well as the embodiment 1, as for the embodiment 2 (Ag Ta alloy) or embodiment 3 (Ag Ti alloy), the content of an additional element that provides fine main data signal and sub-data signal was investigated.

As for the embodiment 2, optical discs of the contents x=1.8, X=7 and X=10 (atomic %) were investigated, and as for the embodiment 3, optical discs of the contents x=4, X=7 and X=10 (atomic %) were investigated. Each data of these embodiment 2 and embodiment 3 are shown in FIGS. 7 to 9 and FIGS. 10 to 12.

As for the embodiment 2 and embodiment 3, from the same view points in each optical disc for the embodiment 1, it is understood that fine main data signal and sub-data signal are able to be provided by the optical disc where each reflective film composition is made such as: Ta content x is 1.1 to 10.5 (atomic %) at Ag Ta alloy; and Ti content x is 5 to 17 (atomic %) at Ag Ti alloy.

Figure 13:
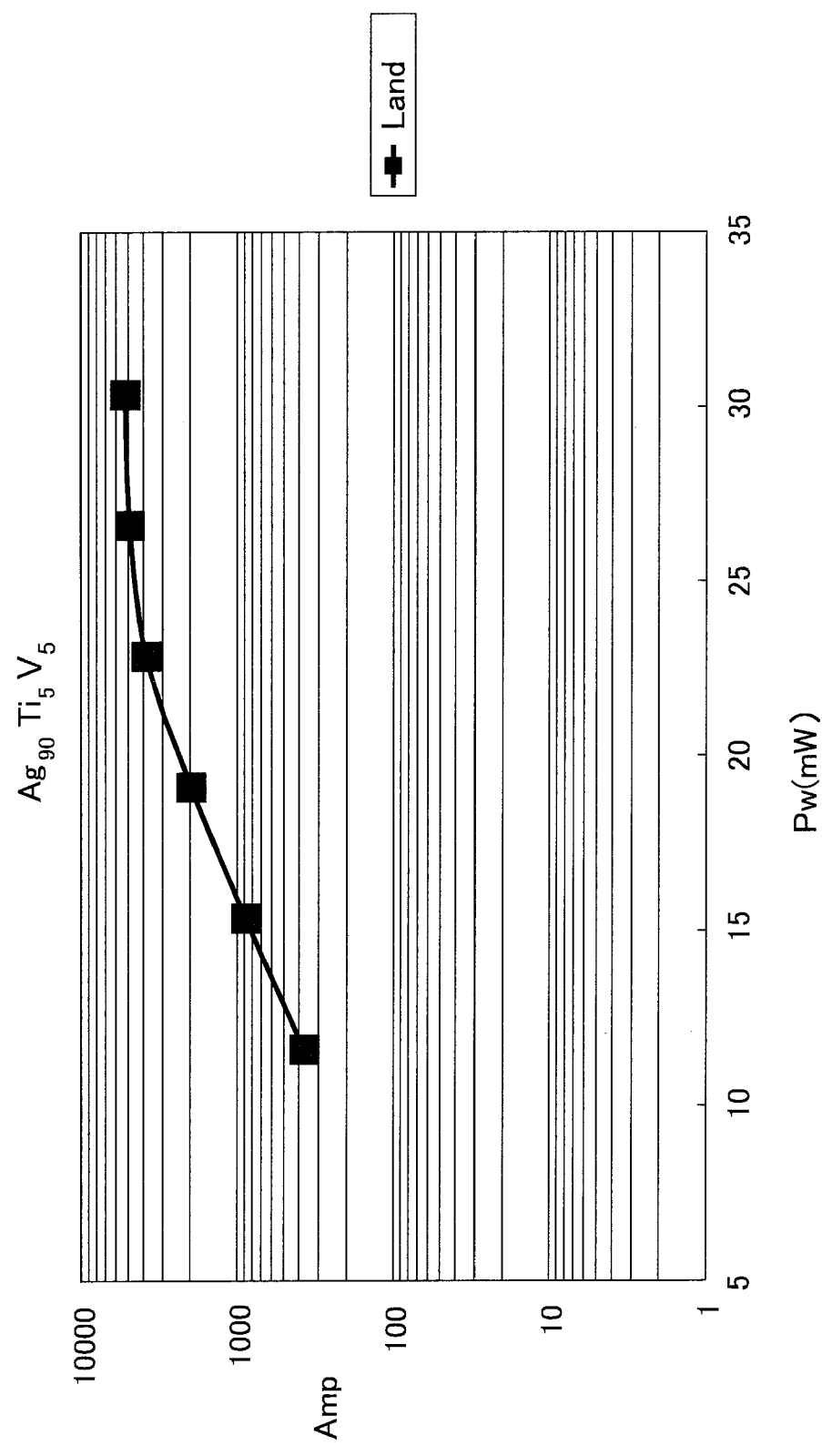
FIG. 13 is a graph that shows a reproducing signal level of sub-data versus a recording laser power when recording sub-data of an optical recording medium in which a reflective film is Ag Ti-alloy film, according to an embodiment.

As for the embodiment 4, as is shown in FIG. 13, it is understood that an optical disc that obtains a characteristic in which a reproducing signal level at a mark-formed portion increases can be provided. Like the embodiment 4, even by adding at least two or more kinds of elements out of Ti, W, Ta, V, Mo, Nb and Zr to Ag, the reproducing signal level at the aforementioned mark-formed portion increases as the target to the aforementioned land with fixed length, and at an optical disc in which the shape of the substrate 101 of the aforementioned optical disc 100 is physically copied and produced, an optical disc where a mark by which a reproducing signal level at a mark-formed portion decreases is formed, more specifically an optical recording medium according to the present invention, is configured.

Next, on the optical disc of the embodiment 1, embodiment 2 and embodiment 3, by using the disc corresponding to an added element content being 10 (atomic %) as for the embodiments 1, 2 and by using the disc corresponding to an added element content being 7 (atomic %) as for the embodiment 3, an experiment was carried out to confirm that polarity of the sub-data signal between the normal version disc and pirate's version disc reverses.

In this case, the reflective film 102 and cover layer 103 were removed from the optical disc 100 in which the recording and reproducing of the sub-data signal were already confirmed as the normal version disc. As for the removal, a method which dissolves the reflective film 102 by the wet process and which removes the cover layer 103 simultaneously was used.

Like this, the substrate 101 where the reflective film 102 and cover layer 103 were removed was sufficiently dried, and then a reflective film 102 and cover layer 103 were formed on it. At this time, it was confirmed beforehand that the surface of the substrate 101 did not receive the influences such as a change in quality or the like in the previous removal process. The reflective film 102 was configured with a sputter film of the Ag alloy where gross weight of added element to Ag was equal to or less than 1 (atomic %).

Figure 14:
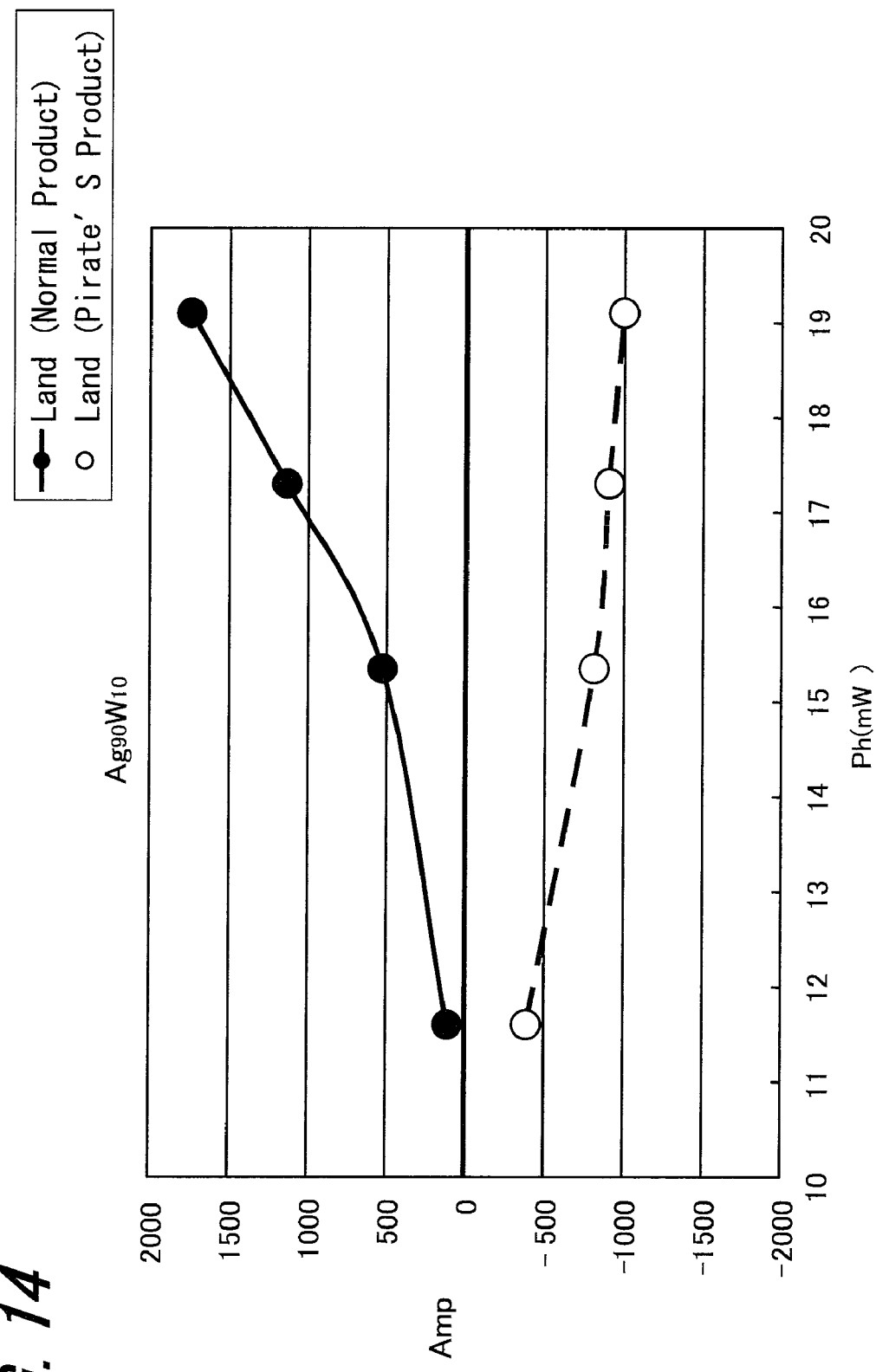
FIG. 14 is a graph that shows a contrast between polarities of sub-data signals in each optical disc of a normal version and pirate's version of a normal versional optical recording medium in which a reflective film is Ag W-alloy film, according to an embodiment.
Figure 15:
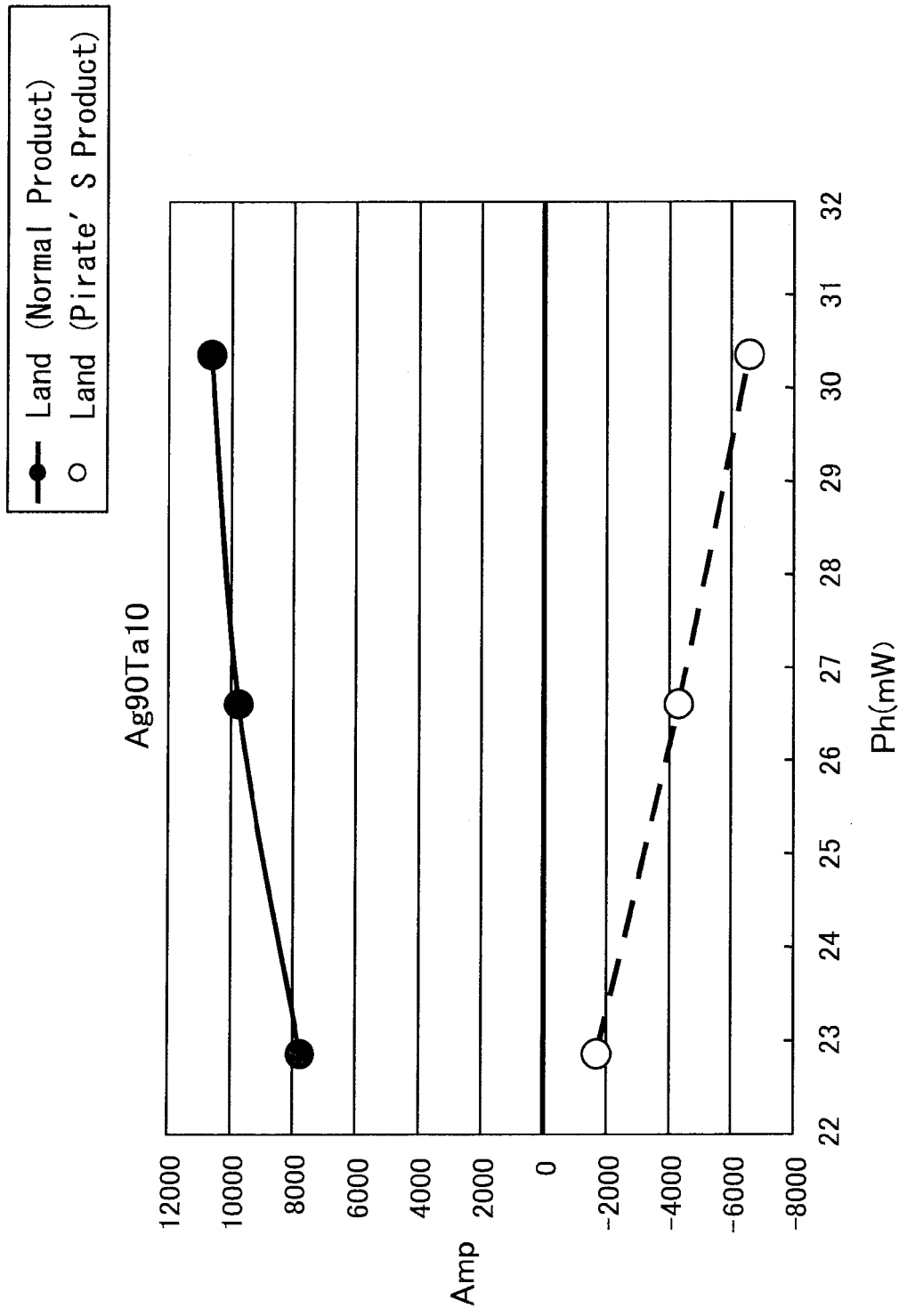
FIG. 15 is a graph that shows a contrast between polarities of sub-data signals in each optical disc of a normal version and pirate's version of a normal versional optical recording medium in which a reflective film is Ag Ta-alloy film, according to an embodiment.
Figure 16:
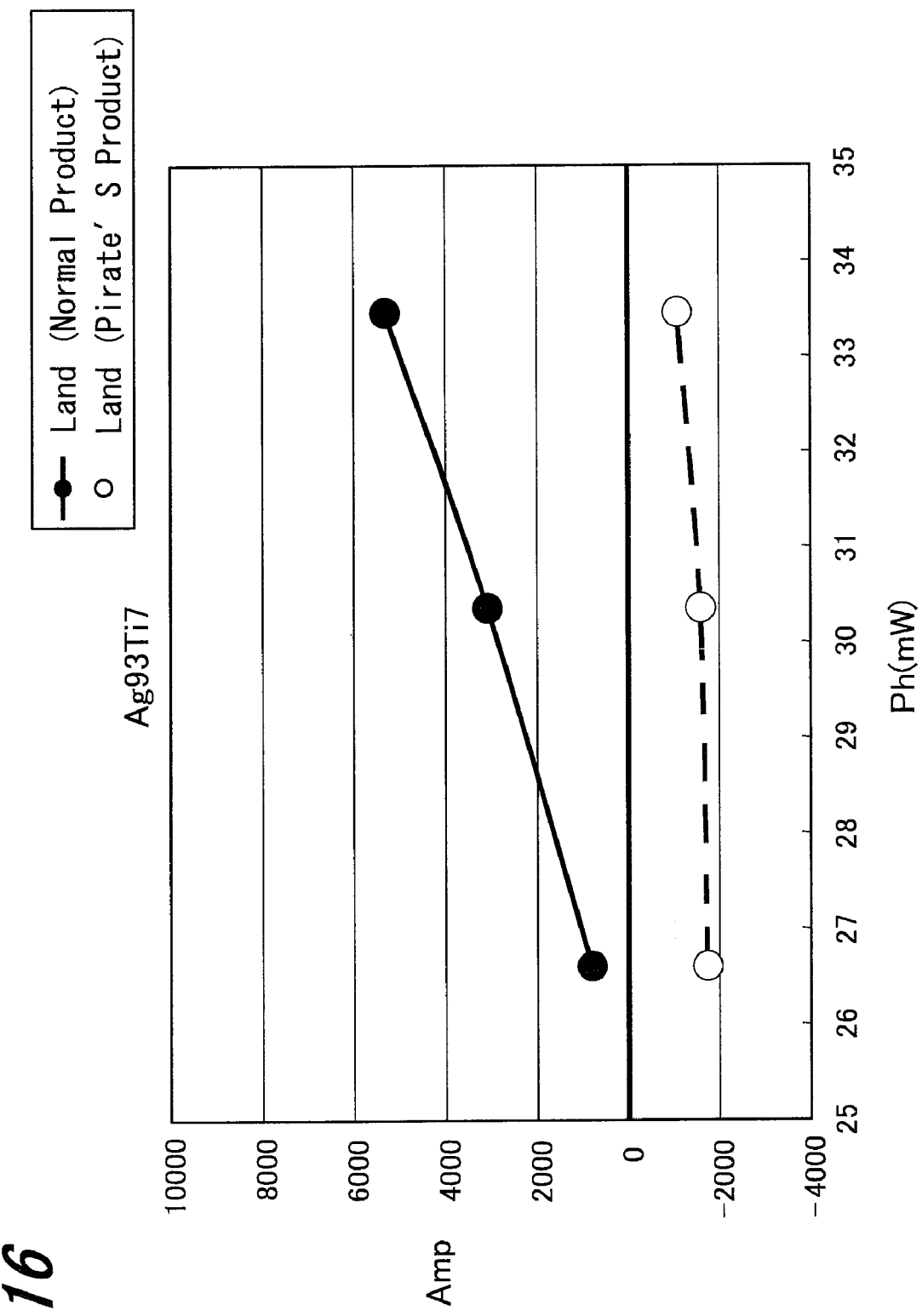
FIG. 16 is a graph that shows a contrast between polarities of sub-data signals in each optical disc of a normal version and pirate's version of a normal versional optical recording medium in which a reflective film is Ag Ti-alloy film, according to an embodiment.

FIGS. 14, 15 and 16 are graphs that contrast and show the polarity of the sub-data signal of each optical disc of the normal version and pirate's version of $Ag_{100-x}X_x$, respectively.

FIG. 14 is the case that made as x=10 at the embodiment 1, specifically $Ag_{90}W_{10}$, and FIG. 15 is the case that made as x=10 at the embodiment 2, specifically $Ag_{90}Ta_{10}$, and FIG. 16 is the case that made as x=7 at the embodiment 1, specifically $Ag_{93}Ti_7$. Then, in each graph, unbroken line and broken line curves are plot graphs of the measured result of the sub-data reproducing signal versus the recording laser power at the normal version optical disc (normal product) and pirate's version optical disc (pirate's product), respectively.

In any case, the inversion of polarity occurs.

Next, the occurrence of such phenomenon was considered according to the embodiments 5 and 6.

As for these embodiments, a characteristic of the reproducing signal level of the normal version disc at the mark-formed portion in the case in which the record was performed to the land as target by using Ag alloy and a characteristic of the reproducing signal level of the pirate's version disc that was produced by the disc that was obtained by physically copying from this normal version disc, specifically the shape of the substrate was physically copied, were observed.

Embodiment 5

A disc substrate with 120 mm diameter and 1.1 mm thickness of a polycarbonate-made whose surface was smoothly and was specular was provided, and a thin film made by Ag alloy that contains Ti of 6.8 atomic %, specifically a reflective film was formed on this substrate by 40 nanometers thickness.

A polycarbonate-made film with 0.1 mm thickness was attached on this thin film by a ultraviolet-ray stiffening type resin and the ultraviolet ray was irradiated and it was stiffened and become a cover layer, consequently a disc was produced. This disc structure is the same as the basic structure of the disc for reproduction-only-type of blu-ray disc.

Next, the laser light which has a spot of elliptic shape with about 1 micrometer of short axis and about 200 micrometers of long axis and which has 810 nanometers of wavelength, was irradiated to this disc from the cover layer side, thereby heating up.

The heating by this laser light irradiation was performed at 3 m/second of disc rotation speed. In this case, the irradiated laser power was about 10 mW/µm$^2$ (micro square meter). The heating area on the disc was a ring shaped area: radius from about 35 mm to 45 mm and about 10 mm width.

Embodiment 6

The same polycarbonate-made substrate as the embodiment 5 was provided, and a thin film made by Ag alloy that contains Ta of 10.0 atomic % in this example, specifically a reflective film was formed on this substrate by 40 nanometers thickness.

As the same as the embodiment 1, A polycarbonate-made film with 0.1 mm thickness was attached on this thin film by the ultraviolet-ray stiffening type resin and the ultraviolet ray was irradiated and it was stiffened and become a cover layer, consequently a disc was produced.

Next, the laser light which has a spot of elliptic shape with about 1 micrometer of short axis and about 200 micrometers of long axis and which has 810 nanometers of wavelength, was irradiated to this disc from the cover layer side, thereby heating up.

The heating by this laser light irradiation was performed at 6 m/second of disc rotation speed. The irradiated laser power was about 5 mW/µm$^2$ (micro square meter). The heating area on the disc was a ring shaped area: radius from about 35 mm to 45 mm and about 10 mm width.

In the above-mentioned discs of embodiments 5 and 6, as for the area that was not heated by aforementioned laser irradiation (no-heating) and the area where the laser irradiation was done (heating), the result in which each reflectance was measured is shown in table 1 of FIG. 17. As for this measurement, the reflectance was measured at 410, 670 and 790 nanometers of wavelength by using a spectroscopic ellipsometer.

According to table 1 of FIG. 17, in either of the embodiments 5 and 6, the reflectance at the heated area, specifically the recorded portion of the sub-data, is changed to the high direction at any measured wavelength.

Figure 18:
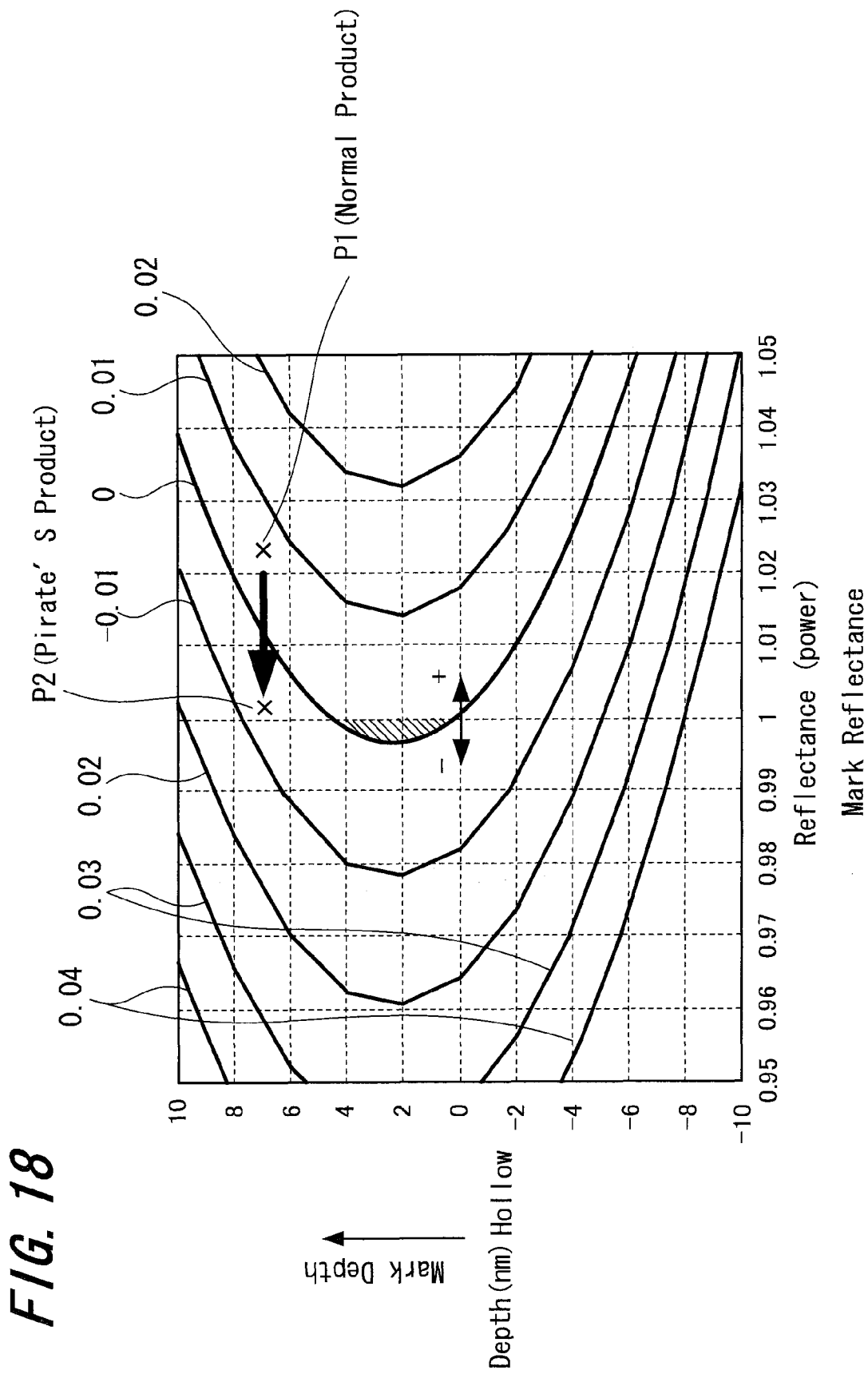
FIG. 18 is a graph that shows a simulation result of a relation between a reflection ratio and a depth of mark, in an output of a difference-signal between a portion where sub-data was recorded and an area where it was not recorded.

FIG. 18 is a graph that shows a simulation result of a relation between a reflection ratio and a depth of mark of the recorded mark portion, in an output of a difference-signal between a portion where sub-data was recorded and an area where it was not recorded.

This FIG. 18 is the one that shows a contour line of difference and a vertical axis is the one in which a depth of the recorded mark portion is taken. Also, a horizontal axis is the one in which the value into which the reflectance does not change is indicated as 1.

As was mentioned at the beginning, a depth of the mark portion is the depth of the hollow by the local transformation at a heated portion by the sub-data recording for the reflective film that was formed on the polycarbonate substrate, for example, of the optical recording medium.

When this hollow was observed by a transmissive electron microscope, for example, the depth was measured as about 7 nanometers.

Then, as is explained in FIG. 17, the optical disc by Ag alloy film according to the present invention increases the reflection ratio after recording (after heating). In this time, for example, an output polarity of the difference signal that is indicated at point P1 is plus (+).

On the other hand, when the pirate's product disc was produced by means of the physical copy from the normal product, the reflection ratio is returned to the original and only the depth of mark is changed, therefore an output of the difference signal that is indicated at point P2 of FIG. 18 becomes minus (−). Like this, it is understood that the polarity of the signal output of the pirate's product disc becomes reverse in comparison with ones of the normal product.

In the above-mentioned simulation, it is the one that explains about that the polarity of the reproducing signal between the normal product and the pirate's product becomes reverse by the phenomenon in which the reflectance changes after recording, but point P2 in FIG. 18, for example, moves to not only the left direction from P1 but also the upper direction when a change to the direction where the depth of the hollow becomes large simultaneously by the recording is also caused, for example.

Next, an example of sub-data recording apparatus that records the aforementioned sub-data to an optical recording medium, for example an optical disc 16, according to the present invention mentioned above is explained.

(Sub-data Recording Apparatus)

Figure 19:
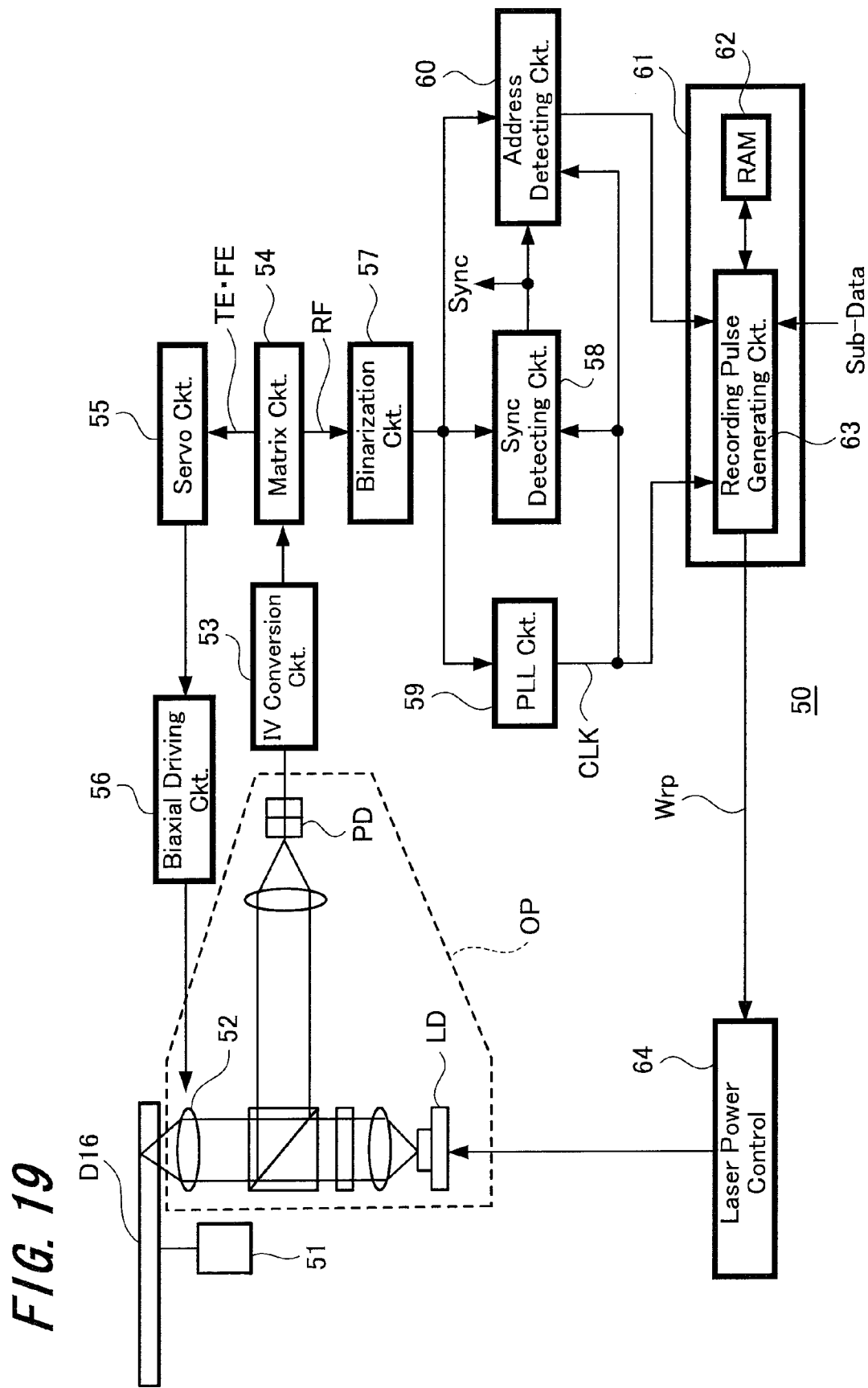
FIG. 19 is a configurational diagram of an example of a sub-data recording apparatus in which an optical recording medium according to an embodiment is used.

FIG. 19 is a configurational diagram of an example of this sub-data recording apparatus.

The sub-data are the ones that record unique identification information to each optical disc 100 as the data contents. Therefore, a sub-data recording apparatus allows each loaded optical disc 100 (D16) to record the sub-data by a different pattern.

Also, as for the sub-data, a section where this is recorded on the optical disc D16 is defined in advance, and furthermore a position where each mark is inserted into this section is also defined in advance. The sub-data recording apparatus 50 is configured so that mark can be recorded at such predetermined specific position.

First, the optical disc D16 is driven and rotated in accordance with a specified turn-drive method by a spindle motor 51 in the state where it is located on a turn-table (not shown). An optical pick-up OP reads out the recorded signal from the optical disc D16 that is driven and rotated, like this.

This optical pick-up OP includes: a laser diode LD that becomes a laser source; an object lens 52 for gathering and irradiating the laser light to the optical disc 100; and a photo detector PD that detects the reflected light based on the aforesaid laser light irradiation from the optical disc D16 or the like.

The reflected light information detected by the photo detector PD inside of the optical pick-up OP is converted to an electric signal by an I-V conversion circuit 53, and then it is supplied to a matrix circuit 54. The matrix circuit 54 generates a reproducing signal RF, tracking error signal TE and a focus error signal FE on the basis of the reflected light information from the I-V conversion circuit 53.

A servo circuit 55 controls a tracking drive signal TD and focus drive signal FD that a biaxial drive circuit 56 outputs on the basis of the tracking error signal TE and focus error signal FE from the matrix circuit 54. These tracking drive signal TD and focus drive signal FD are supplied to a biaxial mechanism (not shown) that holds the object lens inside of the optical pick-up OP, and the object lens 52 is driven to the tracking direction and focus direction on the basis of these signals.

In this servo circuit 55, a biaxial drive circuit 56 and a tracking servo/focus servo system by the biaxial mechanism, the above-mentioned servo circuit 55 performs the controls on the basis of the above-mentioned tracking error signal TE and focus error signal FE, and by means of this, a beam spot of the laser light that is irradiated to the optical disc D16 is controlled to trace a pit sequence (recording track) that is formed on the optical disc D16 and to maintain it with suitable focus condition.

Also, the reproducing signal RF generated at the matrix circuit 54 is supplied to a binarization circuit 57, and here, it is converted to binary data with "0" and "1". This binary data are supplied to a sync detection circuit 58 and PLL (Phase Locked Loop) circuit 59.

The PLL circuit 59 generates a clock CLK synchronized to the binary data that are supplied, and this is supplied as a necessary operational clock of each portion. Especially, this clock CLK is supplied to the above-mentioned binarization circuit 57 and to the sync detection circuit 58, address detecting circuit 60 and sub-data generating circuit 61 that are explained next, as the operational clock.

The sync detection circuit 58 detects a sync pattern that is inserted into every frame shown in previous FIG. 3 from the binary data that are supplied. Concretely, the frame sync detection is carried out by detecting a 9T section in which it is the sync pattern in this case.

A frame sync signal is supplied to the necessary every portion including an address detecting circuit 60.

The address detecting circuit 60 performs the detection of the address information on the basis of the above-mentioned frame sync signal and binary data that are supplied. The detected address information is supplied to a controller (not shown) that performs an overall control to the sub-data recording apparatus 50, and is used to a seek operation or the like. Also, this address information is supplied to a recording pulse generating circuit 63 in a sub-data generating circuit 61.

The sub-data generating circuit 61 includes the recording pulse generating circuit 63 and a RAM (Random Access Memory) 62, as is indicated in the diagram. This sub-data generating circuit 61 generates a recording pulse signal Wrp for recording the sub-data that are recorded to the optical disc D16 by the form in FIG. 20 that is described later, on the basis of the sub-data that are inputted, the address information that is supplied from the above-mentioned address detecting circuit 60 and the clock CLK that is supplied from the PLL circuit 59.

A laser power control portion 64 controls a laser power of the laser diode LD inside of the optical pick-up OP on the basis of the recording pulse signal Wrp that is outputted from the above-mentioned sub-data generating circuit 61. Concretely, the laser power control portion 64 of this case controls so that the laser power with reproducing power can be obtained when the recording pulse signal Wrp is low level (L). Also, the control is performed so that the laser power becomes the recording power when the recording pulse signal Wrp is high level (H)

The laser irradiation is performed by the recording power by the control of this laser power control portion 64, thereby forming the mark on the reflective film 102 at this laser irradiated portion. The sub-data are recorded on the optical disc D16 by the mark that is formed on the reflective film 102, like this.

Figure 20:
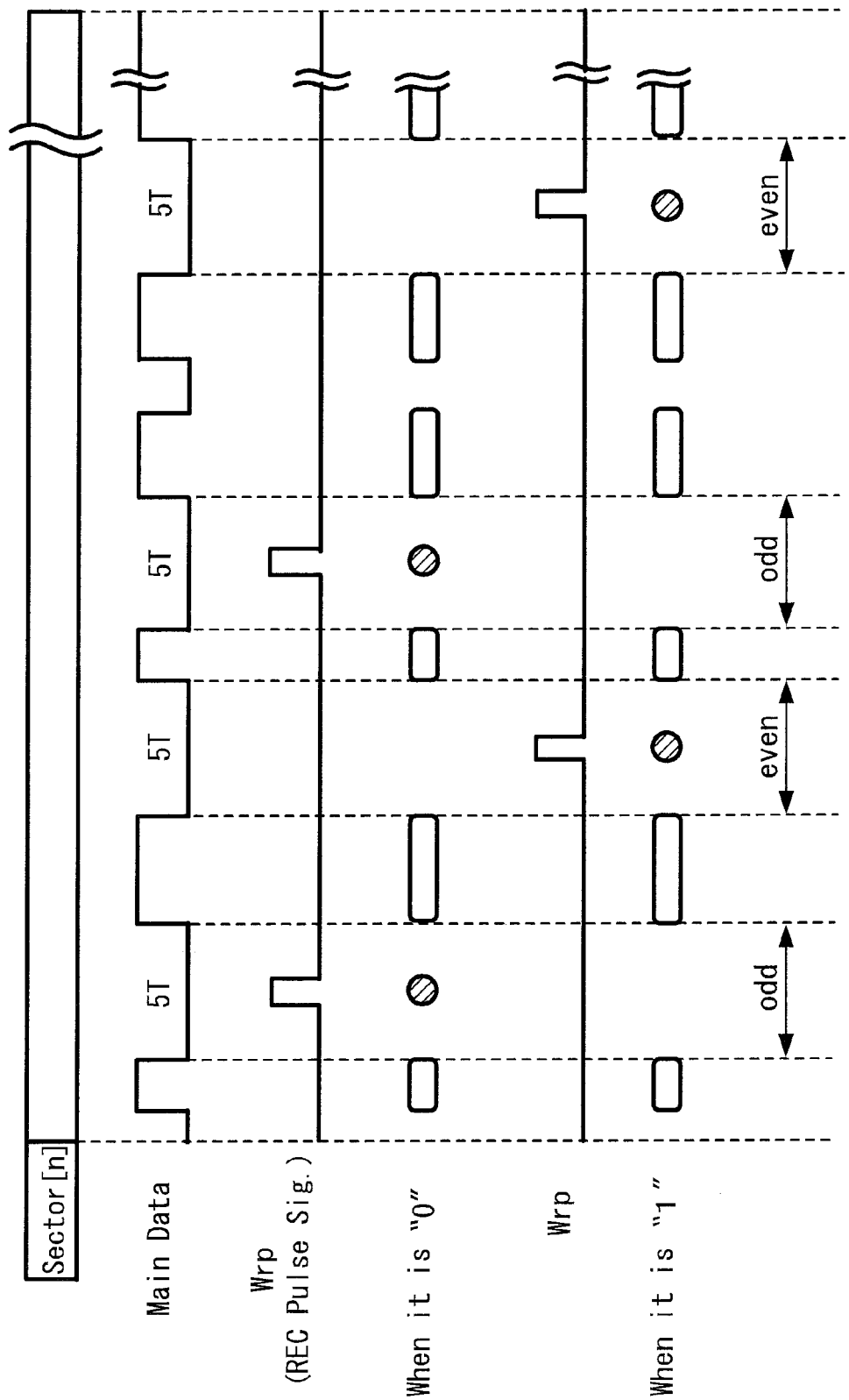
FIG. 20 is an explanatory diagram of a recording of sub-data.

FIG. 20 is an explanatory diagram about the recording form of sub-data that are going to be realized by the operation of the above-mentioned sub-data generating circuit 61.

In this FIG. 20, the examples of cases in which "0" is recorded and in which "1" is recorded as one bit code that configures the sub-data are shown, respectively.

First, as the representation method of the code, as for the land with fixed length that exists in the main data, adjoining odd numbers (odd) and even numbers (even) are considered as one pair. Then, in every pair of adjoining odd numbers and even numbers of these lands of fixed length, the code is defined as "0" when the mark was recorded to the odd numbers and the code is defined as "1" when the mark was recorded to the even numbers.

In this example in FIG. 20, as the land with fixed length, an example in which the mark is recorded to the land of 5T is shown. In addition, an example in which the mark is formed to the land with fixed length is explained, here, but it can also be formed to the pit of fixed length.

Then, in this case, one address unit that becomes an address unit is assigned as the section which is assigned to the record of one bit code that configures the sub-data.

More specifically, as is indicated in this diagram, in every pair of the land with fixed length of adjoining odd numbers and even numbers in one address unit, the mark is recorded by the form by which the same code is represented. Concretely, the mark is recorded only into the odd number of the lands with fixed length in one address unit, as is indicated in the diagram, when the code "0" is recorded.

Also, the mark is recorded only into the even number of the lands with fixed length in one address unit, when the code "1" is recorded.

At the time of reproducing, the sampling is applied for the reproducing signal RF in every pair of adjoining odd numbers and even numbers of the land with fixed length in one address unit, and a value of the reproducing signal that was sampled at the even numbers is reduced from a value of the reproducing signal that was sampled at the odd numbers [odd minus even].

Here, if an example in which the reproducing signal level of the recorded mark is bigger than the reproducing signal level of the portion where the mark is not recorded is considered, the positive value is ideally obtained in every adjoining land with fixed length by performing such calculation of [odd minus even] when it is the code "0" in which the mark was recorded only into the odd numbers. Specifically, when the value of [odd minus even] that was calculated in every each adjoining land with fixed length, like this, is integrated, the positive value is surely obtained and this can be detected. Reversely, when it is the code "1" in which the mark was recorded only into the even numbers, the value of [odd minus even] that is calculated in every adjoining land with fixed length becomes negative value ideally. Therefore, by integrating this, the negative value is surely obtained and this is able to be detected.

In addition, as the optical disc 100, because the reproducing signal level at the mark formed portion is made to be increased, actually the negative value is detected when the mark was recorded only into the odd numbers and the positive value is detected when the mark was recorded only into the even numbers.

Here, the same recording pattern is recorded repeatedly over the specific section like the above and one value is determined at the time of reproducing on the basis of these two or more same recording patterns, and by means of this, the change of reflectance that is given by the mark-recording is sufficient to be small. Like this, because the change of reflectance according to the mark recording can be made small, the recorded mark can avoid exerting the influence to the binarization of the main data. By means of this, the change of reflectance that is given by a recorded mark unit is sufficient to be small.

As for other codes that configure the sub-data, the mark is recorded by the same method as the one that was mentioned above.

Specifically, in this case, the sub-data are recorded over the address units of the same numbers as the codes that configure this.

Like this, the section where the sub-data are recorded (called as the sub-data recording target section, hereinafter) is defined between the sub-data recording apparatus 50 and the reproducing apparatus in advance. Therefore, in the sub-data recording apparatus 50, it is configured so that the recording of the above-mentioned mark can be performed over two or more address units as the sub-data recording target section that was defined like this in advance.

Here, in the above-mentioned recording method, it should be noted that there is a possibility that the binarization of the main data is not carried out suitably when the mark that is recorded to the land with fixed length is recorded to the edge portion. More specifically, because the reflectance becomes the trend that becomes high at the mark recorded portion, when the mark was recorded to the edge portion of the land with fixed length, like this, there is a possibility that a wrong land length (or wrong pitch length) is detected at the binarization.

Therefore, it is assumed that the mark is recorded to the center portion of the land that becomes the recording target. According to this, because the edge portion is usually able to be obtained, it is planned so as not to exert the influence to the binarization, in even this point.

In order to obtain the above-mentioned recording operation, the recording pulse generating circuit 63 inside of the sub-data generating circuit 61 shown in FIG. 19 generates the recording pulse signal Wrp with the timing that is indicated in FIG. 20. Specifically, for the code "0", the recording pulse Wrp that becomes H (high) level at only the center portion in the land with fixed length of odd numbers is generated. Also, for the code "1", the recording pulse Wrp that becomes H level at only the center portion in the land with fixed length of even numbers is generated.

Next, an example of a reproducing apparatus that performs the reproduction to the optical disc 100 in which the sub-data was recorded by the mark formed to the reflective film 102 is explained.

(Reproducing Apparatus)

Figure 21:
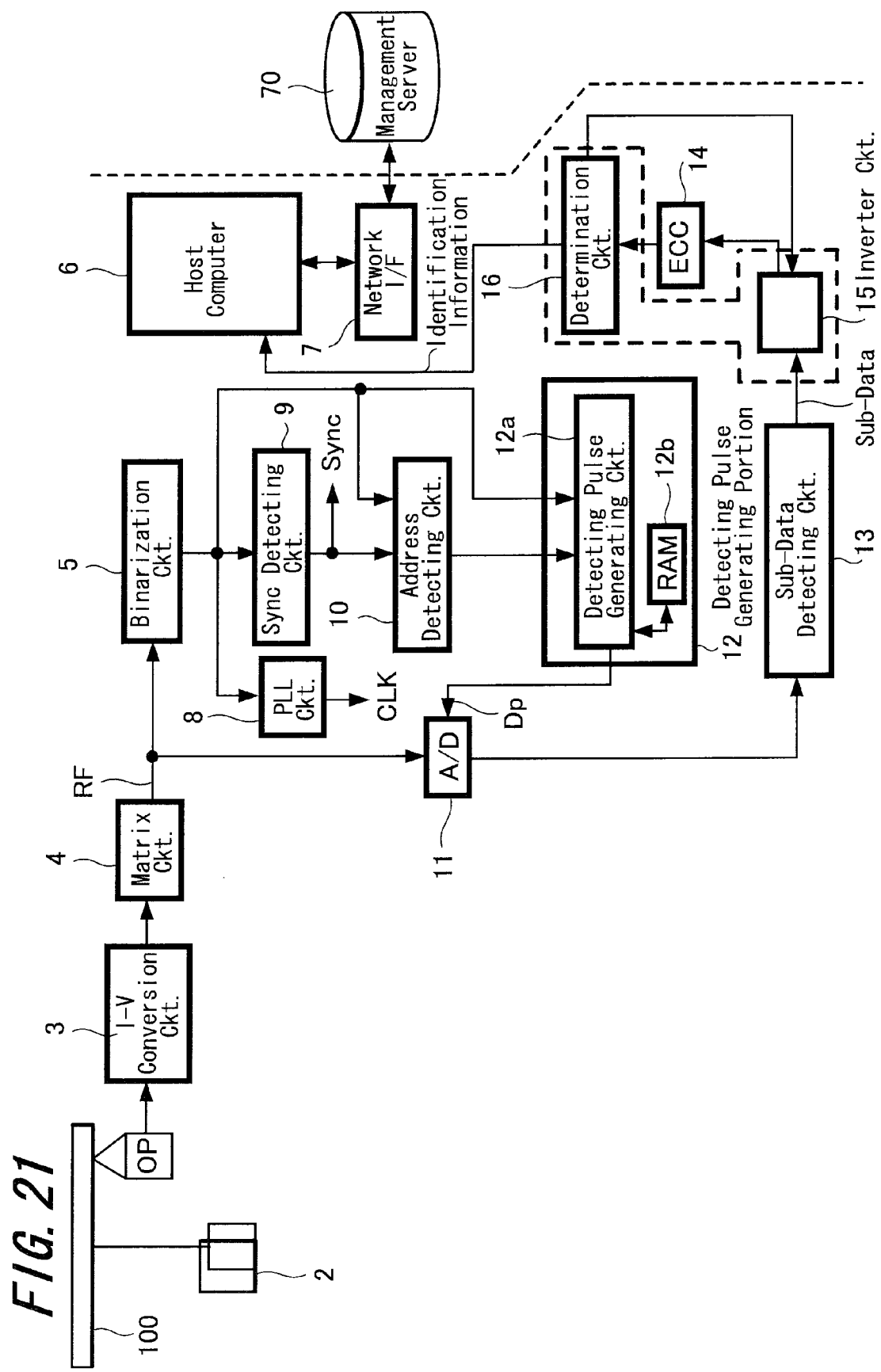
FIG. 21 is a configurational diagram of an example of a reproducing apparatus of sub-data in which an optical recording medium according to an embodiment is used.

FIG. 21 is a block diagram that shows a configuration of this reproducing apparatus 1.

In addition, in FIG. 21, mainly only the part according to the reproduction of the sub-data is extracted and shown, and a configuration of the reproducing system of the main data, especially about configuration of the demodulation system after the binarization, is omitted. Also, about a inverter circuit 15 and determination circuit 16, the explanation is omitted.

In this reproducing apparatus 1, an optical disc 100 is driven and rotated in accordance with a specified turn-drive method by a spindle motor 2 in the state where it is located on a turn-table (not shown). For the optical disc 100 that is driven and rotated, even in this case, an optical pick-up op shown in the diagram reads out the recorded signal (main data).

In addition, in the optical pick-up OP of this case though the drawing is omitted, a laser diode that becomes a laser source, a object lens for gathering and focusing the laser light to the recording surface of the optical pick-up 100, a biaxial mechanism that holds the object lens that can move to the tracking direction and focus direction and a photo detector that detects the reflected light based on the above-mentioned laser irradiation from the optical disc 100 or the like are included.

Also, the laser light that irradiates to the optical disc 100 in the reproducing apparatus 1 is the one according to the reproducing power.

The reflected light information that was detected by the photo detector inside of the above-mentioned optical pick-up OP is converted to an electric signal by an I-V conversion circuit 3, and then it is supplied to a matrix circuit 4. The matrix circuit 4 generates the reproducing signal RF on the basis of the reflected light information from the I-V circuit 3.

Also, as the signals that are generated by this matrix circuit 4, there are a tracking error signal TE and focus error signal FE, though they are not shown. These are supplied to a servo circuit (not shown) and are used for the tracking servo and focus servo control operation.

The reproducing signal RF that was generated by the matrix circuit 4 is supplied to a binarization circuit 5, and is branched and supplied to an A/D converter 11 that is mentioned later.

The binarization circuit 5 converts the reproducing signal that is supplied into the binary data of "0", "1".

Then, this binary data is supplied to a PLL circuit 8, a sync detecting circuit 9 and an address detecting circuit 10.

Also, the binary data is supplied to a pulse generating circuit 12a inside of a pulse generating portion 12 that is mentioned later.

The PLL circuit 8 generates a clock CLK synchronized with the binary data that are supplied and this is supplied as the necessary operational clock of each portion. Especially, the clock CLK in this case is also supplied to the above-mentioned pulse generating circuit 12a (not shown).

The sync detecting circuit 9 detects a sync portion that is inserted into every frame that was indicated in the previous FIG. 3 from the binary data that are supplied. Concretely, the 9T section that is the sync pattern in this case is detected and the frame sync detection is carried out.

The frame sync signal is supplied to every necessary portion including the address detecting circuit 10.

The address detecting circuit 10 performs the detection of the address information from the binary data that are supplied on the basis of the above-mentioned frame sync signal. The detected address information is supplied to a controller that performs a whole control of the above-mentioned reproducing apparatus 1, and is used for the seeking operation or the like. Also, this address information is supplied to the detecting pulse generating circuit 12a inside of the detecting pulse generating portion 12.

In addition, if it is described for confirmation, the optical pick-up OP, I-V conversion circuit 3, matrix circuit 4, binarization circuit 5, PLL circuit 8, sync detecting circuit 9 and the address detecting circuit 10 that were explained up to now are the portions that are also used at the time of reproducing about the main data that were recorded to the optical disc 100. Specifically, each portion of these is the portion that is sharing the configuration of the reproducing system of the main data in the reproduction of the sub-data.

The detecting pulse generating portion 12 generates a detecting pulse signal Dp that indicates the detecting point that corresponds to the mark recording method that was defined to share it with the previous sub-data recording apparatus 50, in the reproduction of the identification information as the sub-data.

A detecting pulse generating circuit 12a and RAM 12b are included in this detecting pulse generating portion 12. The detecting pulse generating circuit 12a generates the above-mentioned detecting pulse Dp on the basis of the information that was stored into the RAM 12b. Then, the detecting pulse signal Dp that was generated is supplied to the A/D converter 11.

To the A/D converter 11, the reproducing signal RF is supplied from the matrix circuit 4. This A/D converter 11 performs the sampling to the reproducing signal RF with the timing that is directed by the above-mentioned detecting pulse signal Dp, and supplies the value to a sub-data detecting circuit 13. The sub-data detecting circuit 13 performs the predetermined calculation about the value that is supplied from the A/D converter 11 and detects each value of the sub-data. Specifically, for example, in this case, each value of the sub-data is detected on the basis of the result in which the calculation corresponding to the [odd minus even] mentioned before was carried out.

The value of the sub-data that was detected by the sub-data detecting circuit 13 is supplied to an ECC (Error Correcting Code) circuit 14.

The sub-data in this case include the identification information and error correcting code. In this ECC circuit 14, the above-mentioned identification information is reproduced by performing a processing of the error correction on the basis of the above-mentioned error correcting code inside of the sub-data.

The reproduced identification information is supplied to a host computer 6 that is shown in the diagram.

The host computer 6 transmits commands to the controller (not shown) that performs a whole control of the above-mentioned reproducing apparatus 1 and directs various operations. For example, it transmits a command by which the reproduction of the main data that are recorded to the optical disc 100 is directed. According to this, the main data that were reproduced from the optical disc 100 is converted to the binary by the binarization circuit 5 and thereafter, they are demodulated (PLL1-7pp demodulated) by a demodulation, applied with error correction processing and the like in the demodulation system (not shown) and it is supplied to this host computer 6.

Also, to this host computer 6, a network interface 7 for implementing data communication via the necessary network is provided. By means of this, as for the host computer 6, the data communication between it and an external apparatus, specifically a management server 70 shown in the diagram, through the network such as the internet is possible.

With respect to the detecting operation of the value of the sub-data that is performed in the reproducing apparatus according to the above-mentioned configuration, it will be explained with reference to FIG. 20.

Figure 22:
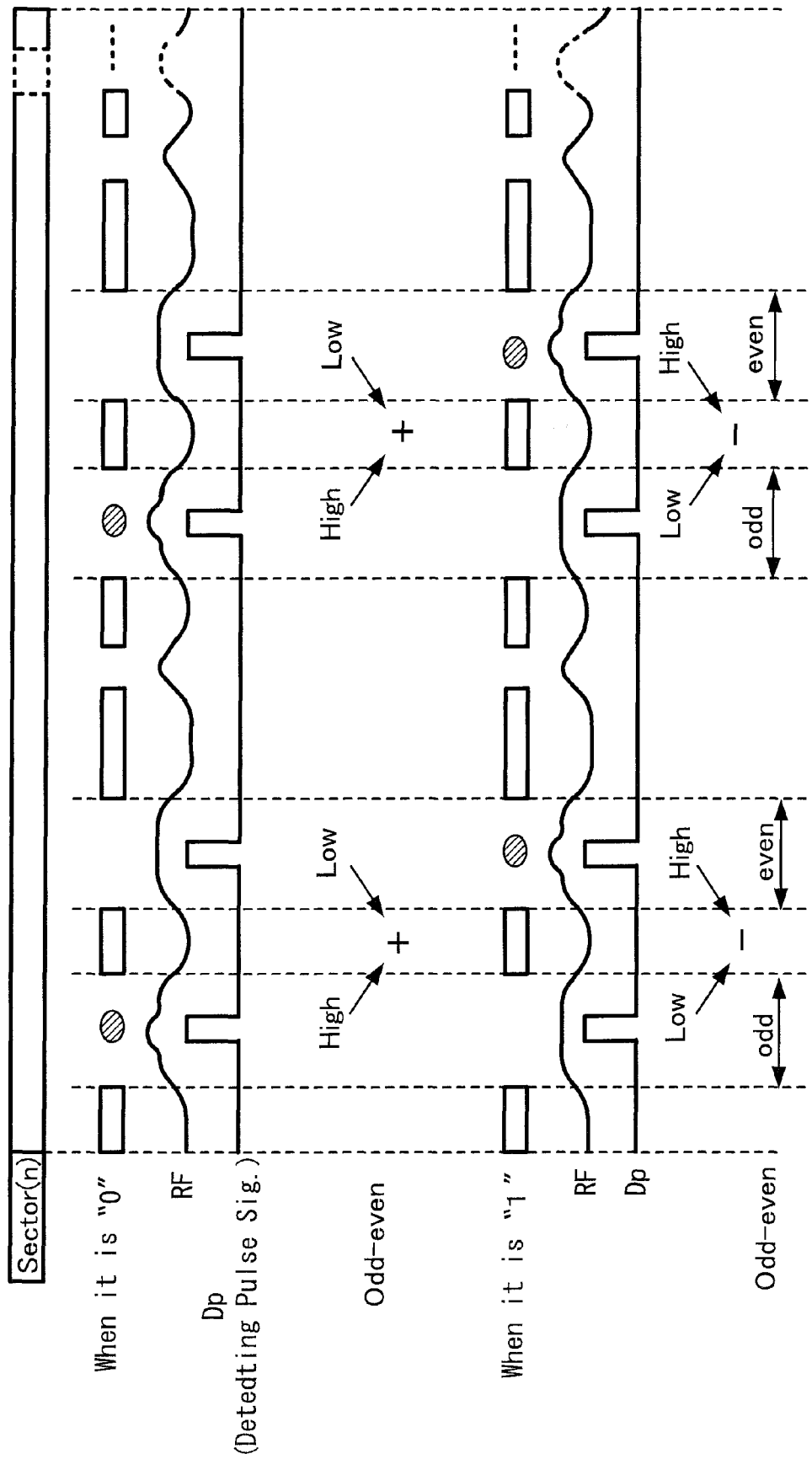
FIG. 22 is an explanatory diagram of a reproducing of sub-data.

In FIG. 22, the recording states of the mark are shown respectively, in the case that assigns "0" and in the case that assigns "1" to one address unit of the optical disc, as one bit value of the sub-data of the optical disc 100. In addition, in this diagram in order to explain, the case in which the pit and land as the main data were formed with the same pattern is shown.

First, as is explained before, the sub-data is recorded so that each information of one bit is assigned to every address unit in the predetermined sub-data recording target section on the optical disc 100.

Also, as the representation method of the code, in this case, the "0" is defined when the mark was recorded into the odd numbers of the lands with fixed length and the "1" is defined when the mark was recorded into the even numbers. Specifically, the mark is recorded into only the odd numbers in the lands with fixed length inside of the address unit when the code is "0", as is indicated in the diagram. Further, the mark is recorded into only the even numbers in the lands with fixed length inside of the address unit when the code is "1".

Here, the portion where the mark was recorded becomes portion where the reflectance slightly increases, for example.

By this reason, as for the waveform of the reproducing signal RF, the level increases at the portion where the mark was recorded, as is indicated in the diagram.

In the reproduction of the sub-data, the operation by which each value is determined is performed, on the basis of the increase of a slight reflectance at such mark recorded portion.

In addition, as is explained previously, each mark is made to record into the center portion of the land with fixed length at the time of recording the sub-data. By recording the mark into the center portion of the land, like this, as is understood with referring to the waveform of the reproducing signal RF that is indicated in this diagram, the level is made to increase at only the center portion in the land where the mark is recorded, and the waveform at the edge portion is usual and is obtained. By means of this, it can avoid exerting the influence to the binarization of the main data by doing as is mentioned before.

Here, according to the above explanation, the value of the reproducing signal RF slightly increases at only the lands with fixed length of the odd numbers when the code is "0". Also, the value of the reproducing signal RF slightly increases at only the lands with fixed length of the even numbers when the code is "1".

Therefore, in this case, when each value of the sub-data that were assigned to each address unit is determined, as for the lands with fixed length in the address unit, it is sufficient to detect which of the odd numbers or even numbers increase the value of the reproducing signal.

The increase of the value of the reproducing signal RF at the mark recorded portion can be detected by obtaining the difference from the value of the reproducing signal RF at the unrecorded portion, for example.

In this case, the mark is recorded to only the odd numbers when the code is "0" and to only even numbers when the code is "1", as is mentioned above, in other words, the even numbers are always the unrecorded portions when the code is "0" and the odd numbers are always the unrecorded portions when the code is "1".

According to this fact, as for the adjoining odd numbers (odd) and even numbers (even), which of the odd numbers or even numbers increase the value of the reproducing signal RF (the mark is recorded) can be examined by performing the calculation according to [odd minus even].

Concretely, if this [odd minus even] is a positive value, the reproducing RF at the odd numbers increases, thereby understanding that the mark is recorded at the odd numbers. Reversely, if the [odd minus even] is a negative value, the reproducing RF at the even numbers increases, thereby understanding that the mark is recorded at the even numbers.

However, actually, the noise component is superimposed to the reproducing signal RF. The decrease of the value of the reproducing signal RF at the mark recorded portion is very small, and therefore there is possibility that is buried into such noise component. Therefore, it becomes difficult to determine the value certainly if the detection according to [odd minus even] is performed to only one pair of the adjoining even numbers of the lands of fixed length.

Because of this, as the reproducing operation of the sub-data, the value of [odd minus even] in which each pair of odd numbers and even numbers that are adjoined as mentioned above is calculated is integrated, and the value of one bit that was assigned to the address unit is determined on the basis of this integrated value. By doing like this, the value of the sub-data can be detected more certainly.

And now, due to the calculation of odd minus even like the above, it is necessary to perform the sampling to the odd and even, specifically the values of the reproducing signals RF that are obtained at the center portions of both lands with fixed length of the odd numbers and even numbers. As the signal by which a sampling timing for calculating this [odd minus even] is directed, the detecting pulse generating portion 12 shown in FIG. 12 generates a detecting pulse signal Dp shown in the diagram.

Here, as the detecting pulse signal Dp for calculating [odd minus even] like the above, as is understood with referring to FIG. 22, it is sufficient to generate the signal that becomes H (high) level at only the center portion of the lands of fixed length that are obtained from the main data.

Then, as for the generation of such detecting pulse signal Dp, as well as the generation of the recording pulse signal Wrp in the case of the previous sub-data recording apparatus 50, it is sufficient to generate a corresponding timing from the contents of the main data that are recorded into the sub-data recording target section of the optical disc 100.

However, the reproducing apparatus 1 is not the one that is not used at the optical disc manufacturing side such as the case of the sub-data recording apparatus 50, therefore the contents that are recorded into the optical disc 100 may not be stored inside the apparatus in advance. Then, the reproducing apparatus 1 reads out the main data in the sub-data recording target section from the optical disc 100 that was loaded, and this is stored inside the apparatus, and then is used to the generation of the above-mentioned detecting pulse signal Dp.

As a memory for storing the main data in the sub-data recording target section that was read out like this, a RAM memory 12b inside of the detecting pulse generating portion 12 that is shown in FIG. 21 is installed in the reproducing apparatus 1. The data structure becomes the one that stores the main data that were read out to each address correspondence, as is shown in FIG. 23.

In the detecting pulse generating circuit 12a inside of the detecting pulse generating portion 12, the data sequence that becomes "1" at only a corresponding timing and becomes "0" all except for it is generated on the basis of the contents of the main data in the recording target section that are stored into the RAM 12b like this, as well as the case of the generation of the previous recording pulse signal Wrp. Then, the detecting pulse signal Dp based on the data sequence that was generated like this, is generated, and then this is supplied to the A/D converter 11. The A/D converter 11 performs the sampling to the value of the reproducing signal RF with the timing that is directed by this detecting pulse signal Dp, thereby being able to perform the sampling to the value of the reproducing signal RF with the suitable timing as is shown in FIG. 22.

As was mentioned above, the optical recording medium according to the present invention is the one that can surely obtain the optical recording medium that can reproduce the recording portion of the sub-data for the reflective film with a higher reproducing level than the unrecorded, by the selection of the composition of the reflective film.

Therefore, by the optical recording medium according to the present invention, as is explained in the beginning in FIG. 24, the cover layer and reflective film are separated from this optical recording medium and the concavity/convexity of the substrate surface including the hollow by the sub-data mark are copied from the substrate 101 that has the hollow by the thermal transformation on the occasion of formation of the sub-data mark and then the pirate's disc is produced, and in this case, the read-out of the sub-data is able to be made impossible substantially.

Specifically, at the recorded mark that was formed by the hollow as is shown in FIG. 24B, the reproducing level decreases in comparison with the unrecorded portion, therefore the pirate's disc that has the normal sub-data that the reproducing level increases by the sub-data, like the optical recording medium in accordance with the present invention, is not able to be obtained. Alternatively, it can immediately identify that it is the pirate's version.

As was mentioned above, the optical recording medium according to the present invention can make the polarity of the reproducing signal reverse in the pirate's version by the illegal copy, thereby being able to identify the optical recording medium of the pirate's version, and consequently the processing that makes the reproduction be impossible becomes possible and the piracy can be prevented effectively.

It should be noted in the above that the optical disc was mainly described, but the shape of the substrate or the like is not intended to be limited therein.

The invention is claimed as follows:

1. An optical recording medium, comprising:
a substrate including main data by a combination of pits and lands recorded on said substrate;
a reflective film formed on the substrate and capable of recording using a laser light, said reflective film having a first reflectance and including a plurality of marks formed into the reflective film by the irradiation of the laser light for recording with respect to said reflective film, the plurality of marks representing sub data and having a second reflectance that is higher than the first reflectance; and
a cover layer formed on the reflective film,
wherein reproducing signal levels at portions where said marks are formed increase for said land of specified length,
wherein the reproducing signal levels decrease at the portions where said marks are formed for an optical disc recording medium that is manufactured by physically copying a surface-shape of said pits and lands of said substrate,
wherein the plurality of marks are at said pits and said lands, and each mark at a respective land is at a center portion of the respective land,
wherein said reflective film is made by an Ag-alloy film of $Ag_{100-x}X_x$, where $0<x<100$, and
wherein said X is an element of at least one of titanium, tungsten, tantalum, vanadium, molybdenum, niobium and zirconium.

2. An optical recording medium according to claim 1, wherein
said reflective film is made by an argentum-alloy film of $Ag_{100-x}X_x$;
where X is titanium; and
a composition x of the titanium in said Ag-alloy film ranges from $5 \leq x \leq 17$ in atomic %.

3. An optical recording medium according to claim 1, wherein
said reflective film is made by an Ag-alloy film of $Ag_{100-x}X_x$;
where X is tungsten; and
a composition x of the tungsten in said Ag-alloy film ranges from $3 \leq x \leq 11$ in atomic %.

4. An optical recording medium according to claim 1, wherein said reflective film is made by an Ag-alloy film of $Ag_{100-x}X_x$;
where X is tantalum; and
a composition x of the tantalum in said Ag-alloy film ranges from $1.1 \leq x \leq 10.5$ in atomic %.

5. An optical recording medium according to claim 1, wherein
said reflective film is made by an Ag argentum-alloy film of $Ag_{100-x}X_x$;
where X is at least one of titanium, tungsten, tantalum, vanadium, molybdenum, niobium, and zirconium; and
a total composition x in said Ag-alloy film ranges from $1.1 < x \leq 17$ in atomic %.

6. An optical recording medium according to claim 1, wherein a depth of each of the plurality of marks is approximately 7 nanometers.

* * * * *